US 9,439,165 B2

(12) United States Patent
Azami

(10) Patent No.: US 9,439,165 B2
(45) Date of Patent: Sep. 6, 2016

(54) POSITION IDENTIFICATION SERVER AND POSITION IDENTIFICATION METHOD

(71) Applicant: YAHOO JAPAN CORPORATION, Tokyo (JP)

(72) Inventor: Munehiro Azami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 19 days.

(21) Appl. No.: 14/329,250

(22) Filed: Jul. 11, 2014

(65) Prior Publication Data

US 2015/0111598 A1 Apr. 23, 2015

(30) Foreign Application Priority Data

Oct. 21, 2013 (JP) ................................. 2013-218742

(51) Int. Cl.
*H04W 24/00* (2009.01)
*H04W 64/00* (2009.01)
*G01S 5/02* (2010.01)

(52) U.S. Cl.
CPC ............ *H04W 64/00* (2013.01); *G01S 5/0252* (2013.01)

(58) Field of Classification Search
CPC ...... H04W 64/003; H04W 64/00; G01S 5/00
USPC .................................................... 455/456.1
See application file for complete search history.

(56) References Cited

U.S. PATENT DOCUMENTS

| 8,385,943 | B1* | 2/2013 | Han | H04W 4/028 455/404.2 |
| 8,990,043 | B1* | 3/2015 | Kolodziej | G01O 5/06 455/404.2 |
| 2009/0067392 | A1* | 3/2009 | Hart | G01S 5/02 370/338 |
| 2010/0026513 | A1* | 2/2010 | Pandey | G06K 7/0008 340/8.1 |
| 2012/0195215 | A1* | 8/2012 | Jeong | H04W 64/006 370/252 |

FOREIGN PATENT DOCUMENTS

JP B2-4840395 12/2011

* cited by examiner

*Primary Examiner* — Timothy Pham
(74) *Attorney, Agent, or Firm* — Oliff PLC

(57) ABSTRACT

A position identification server according to the present application includes a storage unit that stores coefficients of parameters of a discriminant function that indicates whether or not a terminal device is located on each floor and a maximum value of pre-measured radio wave strength of each base station on each floor, a communication unit that receives an actual measurement value of radio wave strength of radio waves received by the terminal device from the base station, and a discrimination unit that calculates the parameters of the discriminant function for each floor based on the actual measurement value of radio wave strength received by the communication unit and the maximum value of radio wave strength stored in the storage unit, calculates a solution of the discriminant function for each floor based on the calculated parameters and the coefficients of the parameters stored in the storage unit, and when there are floors where the solution of the discriminant function is greater than or equal to a predetermined value, discriminates that a floor where the solution of the discriminant function is the greatest is a floor where the terminal device is located.

10 Claims, 18 Drawing Sheets

FIG.3

| BSSID | REPRE-SENTATIVE LATITUDE | REPRE-SENTATIVE LONGITUDE | MaxRSSI | GMMFlag | RECEIVABLE FLOOR ID | ... |
|---|---|---|---|---|---|---|
| aaa123bbb456 | 35.xxxxxx | 136.xxxxxx | -75.0 | 1 | F2, F3 | ... |
| 789ccc012ddd | 35.yyyyyy | 136.yyyyyy | -82.0 | 1 | F2, F3, F4 | ... |
| ee34ff56gg78 | 35.zzzzzz | 136.zzzzzz | -95.0 | 0 | F1 | ... |
| ... | ... | ... | ... | ... | ... | ... |

| FLOOR ID | FILE NAME OF FLOOR DRAWING | WIDTH OF FLOOR DRAWING | HEIGHT OF FLOOR DRAWING | LATITUDE/LONGITUDE OF FLOOR ||||||||| FLOOR NUMBER |
|---|---|---|---|---|---|---|---|---|---|---|---|---|
| | | | | UPPER LEFT || LOWER LEFT || UPPER RIGHT || | |
| | | | | LATI-TUDE | LONGI-TUDE | LATI-TUDE | LONGI-TUDE | LATI-TUDE | LONGI-TUDE | | |
| F1 | F1.png | 1824 | 1290 | 35.xx | 139.xx | 35.yy | 139.yy | 35.zz | 139.zz | 1 |
| F2 | F2.png | 1824 | 1290 | 35.xx | 139.xx | 35.yy | 139.yy | 35.zz | 139.zz | 2 |
| F3 | F3.png | 1824 | 1290 | 35.xx | 139.xx | 35.yy | 139.yy | 35.zz | 139.zz | 3 |
| F4 | F4.png | 1824 | 1290 | 35.xx | 139.xx | 35.yy | 139.yy | 35.zz | 139.zz | 4 |
| ... | ... | ... | ... | ... | ... | ... | ... | ... | ... | ... |

FIG.5

| FLOOR ID | NUMBER OF BSSIDs | BSSID | K | $\pi$ | $\mu_x$ | $\mu_y$ | $\Sigma_{11}$ | $\Sigma_{12}$ | $\Sigma_{22}$ | ... |
|---|---|---|---|---|---|---|---|---|---|---|
| F1 | 11 | aaa123bbb456 | 8 | 0.1 | -78.3 | -79.8 | 1 | 2 | 1 | ... |
|  |  | 789ccc012ddd | 8 | 0.1 | -85.6 | -86.7 | 2 | 1 | 1 | ... |
|  |  | ee34ff56gg78 | 8 | 0.2 | -98.1 | -97.6 | 1 | 1 | 1 | ... |
|  |  | ... | ... | ... | ... | ... | ... | ... | ... | ... |
| F2 | 22 | asd076jyvu89 | 8 | 0.05 | -55.3 | -54.2 | 1 | 1 | 2 | ... |
|  |  | qwe678hjk6yh | 8 | 0.05 | -61.5 | -61.1 | 1 | 2 | 2 | ... |
|  |  | zdf7ui9k3n9ha | 8 | 0.05 | -68.4 | -70.2 | 2 | 2 | 1 | ... |
|  |  | ... | ... | ... | ... | ... | ... | ... | ... | ... |
| ... | ... | ... | ... | ... | ... | ... | ... | ... | ... | ... |

| FLOOR ID | BSSID | RSSI_max | RSSI | | | |
|---|---|---|---|---|---|---|
| | | | 1 | 2 | 3 | ... |
| F1 | BSSID1 | -50 | -75 | -50 | -60 | ... |
| F1 | BSSID2 | -60 | -60 | -68 | -72 | ... |
| F1 | BSSID3 | -60 | -74 | -69 | -60 | ... |
| F1 | BSSID4 | -55 | -55 | -60 | -62 | ... |
| F1 | BSSID5 | -61 | -71 | -61 | -63 | ... |
| F2 | BSSID1 | -60 | -67 | -60 | -70 | ... |
| F2 | BSSID2 | -65 | -65 | -68 | -80 | ... |
| F2 | BSSID4 | -63 | -65 | -63 | -69 | ... |
| F2 | BSSID6 | -54 | -60 | -65 | -54 | ... |
| F2 | BSSID7 | -80 | -80 | -85 | -90 | ... |
| F3 | BSSID1 | -65 | -70 | -65 | -72 | ... |
| F3 | BSSID2 | -70 | -78 | -81 | -70 | ... |
| F3 | BSSID3 | -70 | -70 | -77 | -73 | ... |
| F3 | BSSID8 | -60 | -69 | -60 | -66 | ... |
| F3 | BSSID9 | -63 | -63 | -67 | -71 | ... |
| ... | ... | ... | ... | ... | ... | ... |

| VERIFICATION DATA ID | FLOOR ID | POSITION | BSSID | RSSI | ... |
|---|---|---|---|---|---|
| 0 | F1 | r1 | BSSID1 | -60 | ... |
| 0 | F1 | r1 | BSSID2 | -62 | ... |
| 0 | F1 | r1 | BSSID3 | -58 | ... |
| 0 | F1 | r1 | BSSID4 | -59 | ... |
| 0 | F1 | r1 | BSSID5 | -61 | ... |
| ... | ... | ... | ... | ... | ... |

FIG.8

| VERIFICA-TION DATA ID | ACTUAL MEASUREMENT FLOOR ID | CANDIDATE FLOOR ID | PARAMETER | | | | | SOLUTION OF DISCRIMINANT FUNCTION |
|---|---|---|---|---|---|---|---|---|
| | | | x1 | x2 | x3 | x4 | x5 | f |
| 0 | F1 | F1 | 2 | 1 | -2.8 | 2 | 5 | 1 |
| 0 | F1 | F2 | 4 | 2 | 2.33333 | 3.5 | 3 | 0 |
| 0 | F1 | F3 | 12 | 3 | 8.3333 | 8.3333 | 3 | 0 |
| ... | F1 | ... | ... | ... | ... | ... | ... | ... |
| 1 | F1 | ... | ... | ... | ... | ... | ... | ... |
| ... | ... | ... | ... | ... | ... | ... | ... | ... |
| 2000 | | | | | | | | |
| ... | ... | ... | ... | ... | ... | ... | ... | ... |

126

| FLOOR ID | COEFFICIENT OF PARAMETER OF DISCRIMINANT FUNCTION ||||||  |
|---|---|---|---|---|---|---|---|
|  | k0 | k1 | k2 | k3 | k4 | k5 | ... |
| F1 | 0 | 1 | 1 | 2.5 | 1 | 0.6 | ... |
| F2 | 1 | 1.1 | 1.2 | 2.3 | 0.9 | 0.5 | ... |
| F3 | 2 | 1 | 0.9 | 2.6 | 1.1 | 0.7 | ... |
| ... | ... | ... | ... | ... | ... | ... | ... |
| GLOBAL | 6 | 1.1 | 1.1 | 2.4 | 0.9 | 0.6 | ... |
| ... | ... | ... | ... | ... | ... | ... | ... |

| CANDIDATE FLOOR ID | BSSID | DIFFERENCE (diff) |
|---|---|---|
| F1 | BSSID1 | -10 |
| F1 | BSSID2 | -2 |
| F1 | BSSID3 | 2 |
| F1 | BSSID4 | -4 |
| F1 | BSSID5 | 0 |

⇒

| PARAMETER | VALUE |
|---|---|
| x1 | 2 |
| x2 | 1 |
| x3 | -2.8 |
| x4 | 2 |
| x5 | 5 |

| CANDIDATE FLOOR ID | BSSID | DIFFERENCE (diff) |
|---|---|---|
| F2 | BSSID1 | 0 |
| F2 | BSSID2 | 3 |
| F2 | BSSID4 | 4 |

⇒

| PARAMETER | VALUE |
|---|---|
| x1 | 4 |
| x2 | 2 |
| x3 | 2.33333333 |
| x4 | 3.5 |
| x5 | 3 |

| CANDIDATE FLOOR ID | BSSID | DIFFERENCE (diff) |
|---|---|---|
| F3 | BSSID1 | 5 |
| F3 | BSSID2 | 8 |
| F3 | BSSID3 | 12 |

⇒

| PARAMETER | VALUE |
|---|---|
| x1 | 12 |
| x2 | 3 |
| x3 | 8.33333333 |
| x4 | 8.33333333 |
| x5 | 3 |

POSITION IDENTIFICATION SERVER AND POSITION IDENTIFICATION METHOD

CROSS-REFERENCE TO RELATED APPLICATIONS

The present application claims priority to and incorporates by reference the entire contents of Japanese Patent Application No. 2013-218742 filed in Japan on Oct. 21, 2013.

BACKGROUND OF THE INVENTION

1. Field of the Invention

The present invention relates to a position identification server and a position identification method.

2. Description of the Related Art

Conventionally, it is proposed that a person who has a terminal device uses radio waves of a base station of a wireless LAN (Local Area Network) to perform positioning in a building or the like which radio waves of GPS (Global Positioning System) do not reach. The positioning using a wireless LAN can be performed by, for example, comparing a radio wave strength from each base station with an actual measurement value of radio wave strength at the terminal device by using a database measured at each position in the building in advance. A device including the database stores radio wave strengths measured in advance for each floor for each base station and identification information of each base station in a storage unit and searches the storage unit for the radio wave strengths of each base station from which the terminal device that performs positioning receives radio waves and the identification information of each base station to identify a floor (story) in the building. The device including the database selects a floor where the number of associations with the identification information of the same base station is large on the basis of a search result (for example, Japanese Patent No. 4840395).

However, regarding actual measurement value data of radio wave strength measured at each position in the building, to improve accuracy of the positioning, mesh of measurement positions needs to be fine, so that the database becomes large and load increases. Further, to determine a floor in the building by the number of floors associated with the same base station, data of all base stations in the building is required, so that also the database becomes large.

SUMMARY OF THE INVENTION

It is an object of the present invention to at least partially solve the problems in the conventional technology.

According to one aspect of an embodiment, a storage unit configured to store coefficients of parameters of a discriminant function that indicates whether or not a terminal device is located on each floor and a maximum value of pre-measured radio wave strength of each base station on each floor; a communication unit configured to receive an actual measurement value of radio wave strength of radio waves received by the terminal device from the base station; and a discrimination unit configured to calculate the parameters of the discriminant function for each floor based on the actual measurement value of radio wave strength received by the communication unit and the maximum value of radio wave strength stored in the storage unit, calculate a solution of the discriminant function for each floor based on the calculated parameters and the coefficients of the parameters stored in the storage unit, and when there are floors where the solution of the discriminant function is greater than or equal to a predetermined value, discriminate that a floor where the solution of the discriminant function is the greatest is a floor where the terminal device is located.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a base station storage unit according the embodiment;

FIG. 4 is a diagram illustrating an example of a floor storage unit according the embodiment;

FIG. 5 is a diagram illustrating an example of a GMM storage unit according the embodiment;

FIG. 6 is a diagram illustrating an example of a pre-measurement storage unit according the embodiment;

FIG. 7 is a diagram illustrating an example of a verification data storage unit according the embodiment;

FIG. 8 is a diagram illustrating an example of a candidate floor storage unit according the embodiment;

FIG. 15 is an illustration illustrating an example of parameter calculation of a discriminant function;

DETAILED DESCRIPTION OF THE PREFERRED EMBODIMENT

Figure 1:
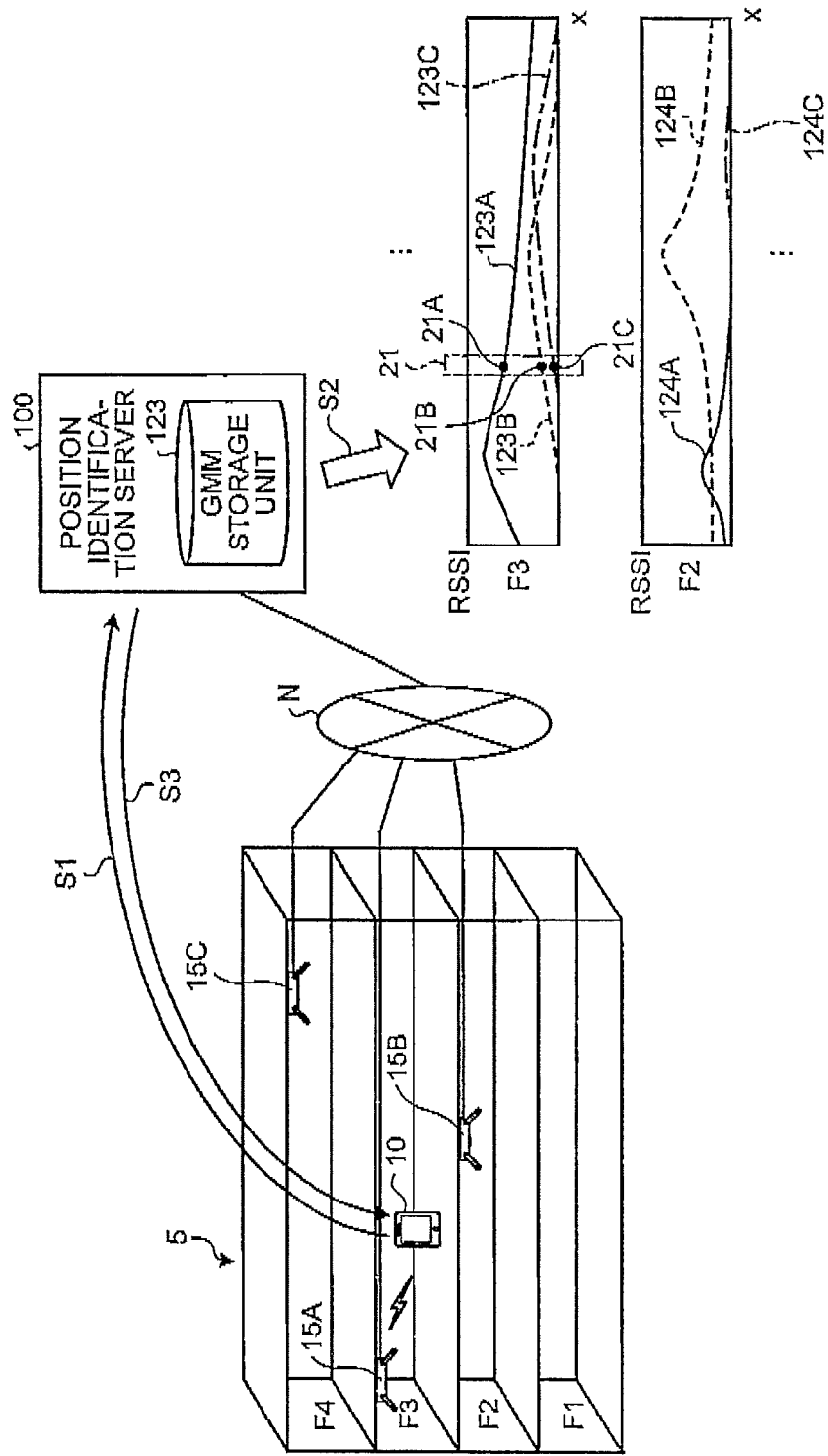
FIG. 1 is an illustration illustrating an example of a position identification process according to an embodiment.

Hereinafter, a form (hereinafter referred to as an "embodiment") to implement the position identification server, the position identification method, the position identification program, and the terminal device according to the present application will be described in detail with reference to the drawings. The position identification server, the position identification method, the position identification program, and the terminal device according to the present application are not limited to the embodiment. In the embodiment described below, the same reference numerals are given to the same components and redundant description is omitted.

1. Outline of Position Identification Process

First, an example of a position identification process according to the embodiment will be described with reference to FIG. 1. FIG. 1 is an illustration illustrating an example of the position identification process according to the embodiment. In the example of FIG. 1, a terminal device 10 receives radio waves of base stations 15A to 15C and transmits BSSID (Basic Service Set Identifier) which is a unique ID of each of the base stations 15A to 150 and radio wave strengths (also referred to as received signal strength indicators (RSSIs)) to the position identification server 100. The position identification server 100 performs the position identification process based on the received BSSIDs and the radio wave strengths. When the base stations 15A to 15C are not distinguished from each other, the base stations 15A to 15C are represented as a base station 15.

First, the terminal device 10 receives the radio waves of the base stations 15A to 150 in a building 5. The terminal device 10 detects the BSSIDs of the base stations 15A to 15C from the received radio waves and acquires an actual measurement value of radio wave strength of the received radio waves for each BSSID. The terminal device 10 associates the BSSID with the actual measurement value of radio wave strength and transmits the BSSID and the actual measurement value of radio wave strength to the position identification server 100 through the network N (step S1 indicated by an arrow in FIG. 1).

The position identification server 100 estimates the position of the terminal device 10 for each floor (story) of the building 5 on the basis of the received BSSID and actual measurement value of radio wave strength and GMM (Gaussian Mixture Model) stored in a GMM storage unit 123 (step S2). When the position identification server 100 can identify the floor by using a discriminant function, the position identification server 100 estimates the position of the terminal device 10 with respect to the floor identified by the discriminant function. Here, the GMM is a radio wave strength of the base station in each floor, which is represented by overlapping a plurality of Gaussian distribution functions. For example, for the floor F3, GMM 123A of the base station 15A, GMM 123B of the base station 15B, GMM 123C of the base station 15C are stored in the GMM storage unit 123. Further, for example, for the floor F2, GMM 124A of the base station 15A, GMM 124B of the base station 15B, GMM 1240 of the base station 15C are stored in the GMM storage unit 123.

For example, it is assumed that the position identification server 100 estimates the position of the terminal device 10 for the floor F3 and the floor F2. The position identification server 100 estimates the position of the terminal device 10 on the floor F3 by performing a comprehensive evaluation using a particle filter on the basis of the actual measurement value of radio wave strength, the GMM 123A, the GMM 123B, and the GMM 123C. The particle filter is one of time series filtering methods. In this method, many next states are assumed to be particles and a weighted average is traced while the weighted average is being estimated as a next state on the basis of the likelihood of all the particles.

The position identification server 100 estimates the position of the terminal device 10 on the floor F3 by the particle filter. The position identification server 100 calculates estimated values of radio wave strength from the base stations 15A to 15C at an estimated position 21 of the terminal device 10. The estimated value of radio wave strength of the base station 15A can be calculated to be an estimated value 21A from the GMM 123A. In the same manner, the estimated value of radio wave strength of the base station 15B can be calculated to be an estimated value 21B from the GMM 1235 and the estimated value of radio wave strength of the base station 15C can be calculated to be an estimated value 21C from the GMM 123C.

The position identification server 100 calculates the probability that the terminal device 10 is located on the floor F3 based on the calculated estimated values 21A to 21C of radio wave strength from the base stations 15A to 15C and the actual measurement values of radio wave strength from the base stations 15A to 15C. The probability that the terminal device 10 is located on the floor F3 can be calculated according to, for example, a difference between the estimated value and the actual measurement value of radio wave strength. In the same manner, for the other floors including the floor F2, the position identification server 100 calculates the probability that the terminal device 10 is located on each floor including the floor F2. Here, it is assumed that the probability that the terminal device 10 is located on the floor F3 is 50% and the probability that the terminal device 10 is located on the floor F2 is 10%.

The position identification server 100 compares the probabilities that the terminal device 10 is located on each floor and identifies that the terminal device 10 is located on the floor of the highest probability, that is, the floor F3. As a result, the position identification server 100 identifies the estimated position 21 of the terminal device 10 and the floor F3.

The position identification server 100 transmits the identified estimated position and floor of the terminal device 10 to the terminal device 10 as position information (step S3). When the terminal device 10 receives the position information, the terminal device 10 notifies a user of the terminal device 10 of the floor and the position where the terminal device 10 is currently located by, for example, displaying the position information on a map of the building 5 displayed on a screen.

In this way, in the position identification process according to the embodiment, the position identification server 100 estimates the position of the terminal device 10 for each floor of the building 5 on the basis of the actual measurement value of radio wave strength and GMM of each of the base stations 15A to 15C. When the position identification server 100 estimates the position of the terminal device 10 for each floor, the position identification server 100 calculates the probability that the terminal device 10 is located on each floor by comparing the actual measurement value of radio wave strength at a receiving position and the estimated value of radio wave strength calculated from the GMM and identifies the floor where the terminal device 10 is located.

The position identification server 100 identifies the floor where the terminal device 10 is located by using a discriminant function for each floor on the basis of the actual measurement value of radio wave strength of each of the base stations 15A to 15C and the maximum value of radio wave strength of each of the base stations 15A to 15C on each floor, which is measured in advance. Therefore, it is possible to notify the user of the terminal device 10 of the floor and the position where the terminal device 10 is currently located. Hereinafter, the terminal device 10, the base stations 15, and the position identification server 100, which perform the position identification process, will be described in detail.

2. Position Identification System

Figure 2:
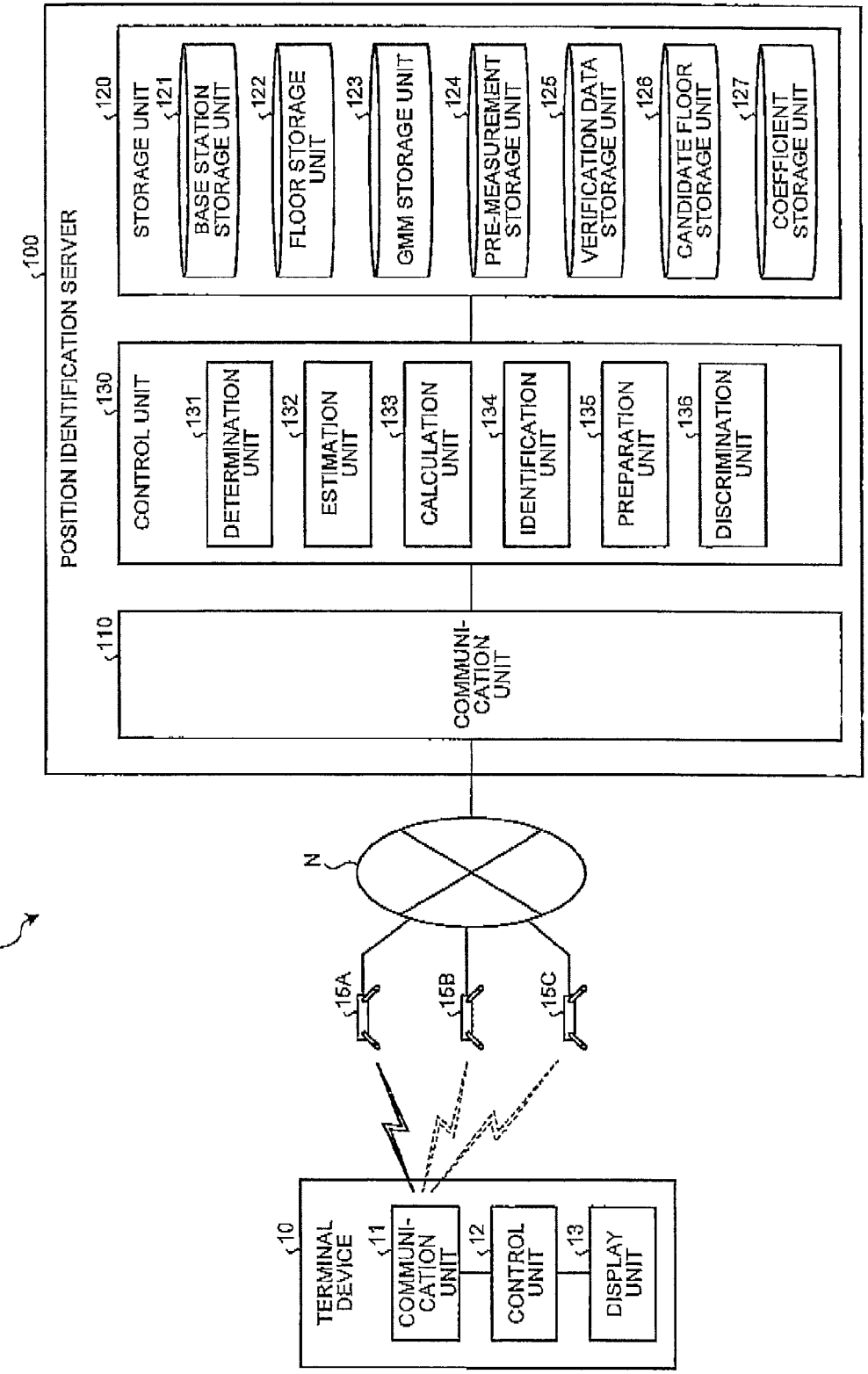
FIG. 2 is a diagram illustrating a configuration example of a position identification system according to the embodiment.

Next, a position identification system 1 according to the embodiment will be described with reference to FIG. 2. FIG. 2 is a diagram illustrating a configuration example of the position identification system according to the embodiment. As illustrated in FIG. 2, the position identification system 1 includes the terminal device 10, the base stations 15, and the position identification server 100. The terminal device 10 and the position identification server 100 are communicably connected by wired or wireless communication through the base station 15 and a network N. Although not illustrated in FIG. 2, the terminal device 10 and the position identification server 100 may be connected through the network N via a base station independent from the base stations 15 (for example, an antenna base station for mobile phones). Although FIG. 2 illustrates an example in which the position identification system 1 includes one terminal device 10 and three base stations 15, the position identification system 1 may include more terminal devices 10 and more base stations 15.

3. Configuration of Terminal Device

Next, a configuration of the terminal device 10 will be described. The terminal device 10 is an information processing device used by a user and, for example, corresponds to a mobile phone (for example, smartphone), a PDA (Personal Digital Assistant), and the like. As illustrated in FIG. 2, the terminal device 10 includes a communication unit 11, a control unit 12, and a display unit 13.

About Communication Unit 11

The communication unit 11 is connected to the base stations 15 and transmits and receives information to and from the position identification server 100 through the network N. The communication unit 11 connects to the base stations 15 by wireless communication. The communication unit 11 can use a wireless LAN or the like as the wireless communication. The communication unit 11 detects BSSIDs for receivable radio waves of the base stations 15 and acquires an actual measurement value of radio wave strength of the received radio waves for each BSSID.

About Control Unit 12

The control unit 12 is realized when, for example, a program stored in an internal storage device is executed by a CPU (Central Processing Unit), an MPU (Micro Processing Unit), or the like, using a RAM as a work area. The control unit 12 is realized by, for example, an integrated circuit such as an ASIC (Application Specific Integrated Circuit) and an FPGA (Field Programmable Gate Array).

The control unit 12 associates the BSSID of the base station 15 acquired by the communication unit 11 with the actual measurement value of radio wave strength acquired by the communication unit 11 and transmits the BSSID and the actual measurement value of radio wave strength to the position identification server 100 through the communication unit 11 and the network N. The control unit 12 maps the position information received from the position identification server 100 onto, for example, a map to display the position information on the display unit 13. The control unit 12 controls the entire terminal device 10 and performs various information processing.

About Display Unit 13

The display unit 13 is a display device to display various information. For example, the display unit 13 is realized by a liquid crystal display or the like. When a touch panel is employed as an input unit not illustrated in FIG. 2, the display unit 13 and the input unit are integrated together.

4. Configuration of Base Station

Next, a configuration of the base station 15 will be described. The base station 15 is, for example, a wireless base station of a wireless LAN. The base station 15 connects to the terminal device 10 by wireless communication and connects to the position identification server 100 through the network N. The bass station 15 is based on, for example, the standard of IEEE802.11a/b/g/n or the like.

5. Configuration of Position Identification Server

Next, a configuration of the position identification server 100 will be described. The position identification server 100 is a server device that estimates the position of the terminal device 10 for each floor on the basis of the BSSID and the radio wave strength received from the terminal device 10 and the GMM stored in the GMM storage unit 123 described later. As illustrated in FIG. 2, the position identification server 100 includes a communication unit 110, a storage unit 120, and a control unit 130. The position identification server 100 may include an input unit (for example, keyboard, mouse, and the like) that receives various operations from an administrator or the like of the position identification server 100 and a display unit (liquid crystal display, or the like) to display various information.

About Communication Unit 110

The communication unit 110 is realized by, for example, a NIC (Network Interface Card) or the like. The communication unit 110 transmits and receives information to and from the terminal device 10 through the network N and the base station 15.

About Storage Unit 120

The storage unit 120 is realized by, for example, a semiconductor memory element such as a RAM and a flash memory or a storage device such as a hard disk and an optical disk. The storage unit 120 includes a base station storage unit 121, a floor storage unit 122, a GMM storage unit 123, a pre-measurement storage unit 124, a verification data storage unit 125, a candidate floor storage unit 126, and a coefficient storage unit 127. The storage unit 120 stores an OS (Operating System) executed in the control unit 130, various programs, and various data.

About Base Station Storage Unit 121

The base station storage unit 121 stores the BSSID and the like of the base station 15 received by the terminal device 10. FIG. 3 is a diagram illustrating an example of the base station storage unit according to the embodiment. As illustrated in FIG. 3, the base station storage unit 121 includes items such as "BSSID", "representative latitude", "representative longitude", "MaxRSSI", "GMMFlag", and "receivable floor ID".

The "BSSID" is a BSSID detected from the radio waves received from the base station 15 and identifies the base station 15. The "representative latitude" and the "representative longitude" indicate the latitude and longitude of a position where the radio wave strength is the strongest when measuring the radio wave strength at a plurality of positions in advance to derive a GMM parameter (the details will be described later). The "MaxRSSI" indicates the maximum value of the actual measurement values of radio wave strength corresponding to the BSSID at the representative latitude and the representative longitude. In an example of the first row in FIG. 3, for example, −75.0 dBm is measured as the radio wave strength. The "GMMFlag" indicates whether or not the GMM parameter used to estimate a position has already been derived. For example, "1" indicates that the GMM parameter has already been derived and "0" indicates that the GMM parameter has not yet been derived. The "receivable floor ID" indicates a floor ID of a floor where the radio waves from the base station 15 having the BSSID can be received.

About Floor Storage Unit 122

The floor storage unit 122 stores information of floors in a building in which positioning is performed. BIG. 4 is a diagram illustrating an example of the floor storage unit according to the embodiment. As illustrated in FIG. 4, the floor storage unit 122 includes items such as "floor ID", "file name of floor drawing", "width of floor drawing", "height of floor drawing", "latitude/longitude of floor", and "floor number".

The "floor ID" identifies a floor. A unique ID may be assigned to the floor ID, for example, in order to be used for a plurality of buildings. The "file name of floor drawing" indicates a file of a floor drawing. The floor drawing is, for example, a drawing in which pillars, walls, and the like are drawn. The "width of floor drawing" and the "height of floor drawing" are, for example, the numbers of pixels of a drawing in the horizontal and the vertical directions. The "latitude/longitude of floor" is to determine an area of the floor and, for example, indicates the latitude and longitude of the upper left, lower left, and upper right corners of the floor. The "floor number" indicates what floor the floor is in the building. By these pieces of information, the pixel coordinates of the floor drawing and the latitude and longitude can be converted into each other.

About GMM Storage Unit 123

The GMM storage unit 123 stores the BSSIDs of each floor and the GMM corresponding to the BSSID. FIG. 5 is a diagram illustrating an example of the GMM storage unit according to the embodiment. As illustrated in FIG. 5, the GMM storage unit 123 includes items such as "floor ID", "the number of BSSIDs", "BSSID", "K", "$\pi$", "$\mu_x$", "$\mu_y$", "$\Sigma_{11}$", "$\Sigma_{12}$", and "$\Sigma_{22}$".

The "floor ID" identifies a floor. The "the number of BSSIDs" indicates the number of base stations 15 from which radio waves can be received at the floor, that is, the number of the BSSIDs. The "BSSID" identifies a base station 15. The "K" is a GMM parameter and indicates a mixed number of normal distribution. The "$\pi$" is a GMM parameter and indicates a mixing coefficient representing a weight of each normal distribution. The sum of all mixing coefficients $\pi$ is 1. The "$\mu_x$" and the "$\mu_y$" are GMM parameters and indicate averages of normal distribution in the x direction and the y direction. The "$\Sigma_{11}$", the "$\Sigma_{12}$", and the "$\Sigma_{22}$" are GMM parameters and indicate a variance-covariance matrix of normal distribution. Here, a GMM for calculating a GMM parameter is illustrated in Formula (1). Formula (1) is represented by a superposition of normal distributions considering normalization. The GMM parameter is derived based on this formula. Formula (2) illustrates a conversion formula between the radio wave strength RSSI and the GMM. The coefficients α and β can be calculated by the least square method (not illustrated in the drawings).

$$p(x,y) \cong \Sigma_k^n \pi_k N(x,y|\mu_k, \sigma_k) \quad (1)$$

$$RSSI(x,y) = \alpha \cdot p(x,y) + \beta \quad (2)$$

The shape of a two-dimensional GMM is determined by an average of individual normal distributions μ, a variance-covariance matrix Σ, and a mixing coefficient π. The position identification server 100 represents a distribution of the radio wave strength on a floor by using the GMM.

Here, the calculation of the GMM will be described. The calculation of the GMM is based on a paper "A Wireless LAN Location Estimation Method Based on Gaussian Mixture Model" (SUSUMU FUJITA, KATSUHIKO KAJI, and NOBUO KAWAGUCHI; Journal of Information Processing Society of Japan Vol. 52 No. 3 1069-1081 (March 2011)).

An administrator of the position identification server 100 measures the radio wave strength of the base station 15 on a certain floor by using the terminal device 10 or another measurement device. For example, measurement points of the radio wave strength are set at intervals of several meters. The administrator performs the measurement a plurality of times at each measurement point and determines an average of the measurements as the radio wave strength at the measurement point. The administrator converts data of the radio wave strength at a large number of measurement points into a two-dimensional point distribution. In the conversion into the two-dimensional point distribution, an area is divided for each measurement point, and points, the number of which corresponds to the radio wave strength, are scattered in each area, so that the data is converted into a distribution of points. The area can be divided by using Voronoi tessellation.

Figures 9, 10:
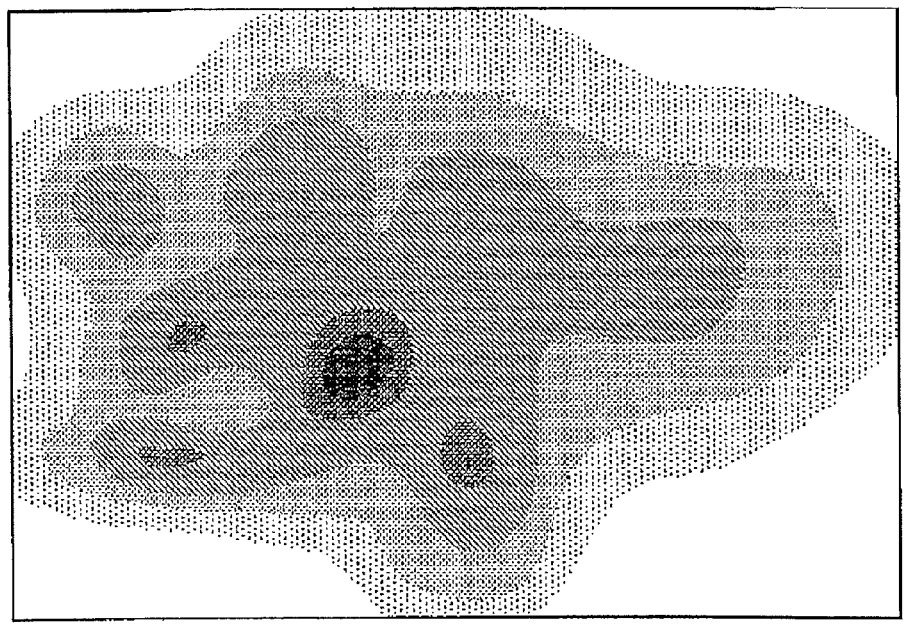
FIG. 9 is a diagram illustrating an example of a coefficient storage unit according the embodiment.
FIG. 10 is an illustration illustrating an example of GMM according to the embodiment.

Subsequently, the distribution of points is converted into GMM by using EM algorithm. The EM algorithm has two update procedures including E step and M step. The E step and the M step are repeated until a convergence criterion is satisfied by calculating a logarithmic likelihood function. FIG. 10 illustrates an example of the GMM calculated in this way. FIG. 10 is an illustration illustrating an example of the GMM according to the embodiment. The GMM is a combination of Gauss functions (bell-shaped functions) and can be represented by a so-called heat map having a mountainous shape. In FIG. 10, a portion, where a contour line of the heat map, that is, the radio wave strength, has the same value or a value within a predetermined range, is represented as the same hatching.

About Pre-Measurement Storage Unit 124

The pre-measurement storage unit 124 stores premeasured radio wave strength of each base station at each floor and the maximum value of the premeasured radio wave strength. FIG. 6 is a diagram illustrating an example of the pre-measurement storage unit according to the embodiment. As illustrated in FIG. 6, the pre-measurement storage unit 124 includes items such as "floor ID", "BSSID", "RSSI_max", and "RSSI".

The "floor ID" identifies a floor. The "BSSID" is a BSSID detected from the radio waves received from the base station 15 on a corresponding floor and is identification information that identifies the base station 15. However, any other identification information may be used according to a configuration and technical specifications if the identification information can identify the base station 15. The "RSSI_max" indicates the maximum value of the radio wave strength for each BSSID on each floor among the radio waves received from the base station 15 on the floor. The "RSSI" indicates the actual measurement values of radio wave strength received from the base station 15 at a plurality of positions on the floor.

About Verification Data Storage Unit 125

The verification data storage unit 125 stores the actual measurement value of radio wave strength of each base station 15 for which a floor and a position where the measurement is performed in advance are known. FIG. 7 is a diagram illustrating an example of the verification data storage unit according to the embodiment. As illustrated in FIG. 7, the verification data storage unit 125 includes items such as "verification data ID", "floor ID", "position", "BSSID", and "RSSI".

The "verification data ID" identifies verification data. The "floor ID" identifies a floor where the verification data is measured. The "position" indicates a position at which the verification data is measured on the floor. Although the position is represented as "r1" for simplification in FIG. 7, in practice, the position is position information represented by the latitude and longitude or the like. The "BSSID" is a BSSID detected from the radio waves received from the base station 15 at a position at which the verification data is measured. The "BSSID" identifies the base station 15. The "RSSI" indicates the value of radio wave strength received from the base station 15 at the position at which the verification data is measured.

About Candidate Floor Storage Unit 126

The candidate floor storage unit 126 stores parameters of a discriminant function calculated for each verification data ID, actual measurement floor ID, and candidate floor ID, and a solution of the discriminant function given by an administrator of the position identification server 100. The discriminant function will be described later. FIG. 8 is a diagram illustrating an example of the candidate floor storage unit according to the embodiment. As illustrated in FIG. 8, the candidate floor storage unit 126 includes items such as "verification data ID", "actual measurement floor ID", "candidate floor ID", "parameter x1", "parameter x2", "parameter x3", "parameter x4", "parameter x5", and "solution f of discriminant function".

The "verification data ID" identifies verification data. The "actual measurement floor ID" indicates a floor where the verification data is actually measured. The "candidate floor ID" compares the BSSIDs which are received for each floor ID and which are stored in the pre-measurement storage unit 124 with the BSSIDs included in the verification data and indicates a floor ID which has a matched BSSID and which is stored in the pre-measurement storage unit 124. In other words, the "candidate floor ID" indicates a floor where one or more radio waves can be received from among radio waves from the base stations 15 having a BSSID included in the verification data.

The "parameter x1" indicates the maximum value of differences between the actual measurement values of radio wave strength (RSSI) of the verification data and the maximum value of radio wave strength (RSSI_max) stored in the pre-measurement storage unit 124. The "parameter x2" indicates the number of positive differences between the RSSIs and the RSSI_max. The "parameter x3" indicates an average of the differences between the RSSIs and the RSSI_max. The "parameter x4" indicates an average of positive differences between the RSSIs and the RSSI_max. The "parameter x5" indicates the number of matched BSSIDs when comparing the BSSIDs which are received for each floor ID and which are stored in the pre-measurement storage unit 124 with the BSSIDs included in the verification data. In other words, the "parameter x5" indicates the number of matched base stations 15 between the base stations 15 from which the terminal device 10 receives radio waves for each floor and the base stations 15 on each floor stored in the pre-measurement storage unit 124.

The "solution f of discriminant function" indicates a solution of the discriminant function given by the administrator of the position identification server 100. In the "solution f of discriminant function", "1" is inputted when the actual measurement floor ID and the candidate floor ID of the verification data ID correspond with each other and "0" is inputted when the actual measurement floor ID and the candidate floor ID of the verification data ID do not correspond with each other.

About Coefficient Storage Unit 127

The coefficient storage unit 127 stores coefficients of parameters of the discriminant function calculated for each floor ID. FIG. 9 is a diagram illustrating an example of the coefficient storage unit according to the embodiment. As illustrated in FIG. 9, the coefficient storage unit 127 includes items such as "floor ID", "coefficient k0 of parameter of discriminant function", "coefficient k1 of parameter of discriminant function", "coefficient k2 of parameter of discriminant function", "coefficient k3 of parameter of discriminant function", "coefficient k4 of parameter of discriminant function", and "coefficient k5 of parameter of discriminant function".

The "floor ID" identifies a floor. Although the "coefficient k0 of parameter of discriminant function" indicates a constant term of the discriminant function, that is, a constant, the "coefficient k0 of parameter of discriminant function" is referred to as "coefficient" for consistency of expression. The "coefficient k1 of parameter of discriminant function" indicates a coefficient corresponding to the parameter x1. The "coefficient k2 of parameter of discriminant function" indicates a coefficient corresponding to the parameter x2. The "coefficient k3 of parameter of discriminant function" indicates a coefficient corresponding to the parameter x3. The "coefficient k4 of parameter of discriminant function" indicates a coefficient corresponding to the parameter x4. The "coefficient k5 of parameter of discriminant function" indicates a coefficient corresponding to the parameter x5. The coefficients of parameters of discriminant function are calculated for each floor by a known regression analysis (in particular, discriminant analysis) of multivariate analysis on the basis of the data stored in the candidate floor storage unit 126. The numerical values illustrated in FIG. 9 are a conceptual example and actual numerical values based on the actual measurement values are various ranges of numerical values such as, for example, k0=43.7, k1=−30.9, k2=−34.8, k3=8.0, k4=10.3, and k5=52.7. As a new parameter, the minimum value of differences between the actual measurement values of radio wave strength (RSSI) and the maximum value of radio wave strength (RSSI_max) on the floor can be provided as a parameter x6. In this case, when a corresponding coefficient is k6, for example, k6 may have a numerical value of −12.1.

About Control Unit 130

Let us return to the description of FIG. 2. The control unit 130 is realized when, for example, a program stored in an internal storage device is executed by a CPU, an MPU, or the like, using a RAM as a work area. The control unit 130 is realized by, for example, an integrated circuit such as an ASIC and an FPGA.

As illustrated in FIG. 2, the control unit 130 includes a determination unit 131, an estimation unit 132, a calculation unit 133, an identification unit 134, a preparation unit 135, and a discrimination unit 136, and realizes or implements a function and an action of information processing described below. An internal configuration of the control unit 130 is not limited to the configuration illustrated in FIG. 2, but may be other configuration as long as the configuration performs the information processing described below.

About Determination Unit 131

When the determination unit 131 receives the BSSIDs and the actual measurement values of radio wave strength from the terminal device 10, the determination unit 131 counts the number of unique BSSIDs for each floor ID, that is, for each floor in the building. Specifically, the determination unit 131 refers to the base station storage unit 121 and extracts the number of BSSIDs of the base stations 15 that can be received on only a certain floor from among the received BSSIDs. When there is no unique BSSID, the determination unit 131 refers to the base station storage unit 121, extracts a floor where radio waves can be received as a possible floor, and outputs the floor ID of the extracted floor and the actual measurement value of radio wave strength to the discrimination unit 136.

When there are one or more unique BSSIDs, the determination unit 131 determines one or more floors where the number of unique BSSIDs is the greatest. When the number of the floors where the number of unique BSSIDs is the greatest is one, the determination unit 131 identifies that the determined floor is the floor where the terminal device 10 is located. When the number of the floors where the number of unique BSSIDs is the greatest is two or more, the determination unit 131 identifies that a floor, to which a BSSID with the maximum actual measurement value of radio wave strength among the unique BSSIDs belongs, is the floor where the terminal device 10 is located.

The determination unit 131 extracts a BSSID with the actual measurement value of radio wave strength, which is greater than a predetermined threshold value. When the determination unit 131 can extract a BSSID with the actual measurement value of radio wave strength, which is greater than the predetermined threshold value, the determination unit 131 outputs the extracted BSSID to the estimation unit 132. When the determination unit 131 cannot extract a BSSID with the actual measurement value of radio wave strength, which is greater than the predetermined threshold value, for example, the determination unit 131 lowers the predetermined threshold value by 10 dBm and extracts a BSSID again. When the determination unit 131 can extract a BSSID with the actual measurement value of radio wave strength, which is greater than the lowered threshold value, the determination unit 131 outputs the extracted BSSID to the estimation unit 132. When the determination unit 131 cannot extract a BSSID with the actual measurement value of radio wave strength, which is greater than the lowered threshold value, for example, the determination unit 131 lowers again the predetermined threshold value by 10 dBm and extracts a BSSID again. When the determination unit 131 can extract a BSSID with the actual measurement value of radio wave strength, which is greater than the threshold value that is lowered twice, the determination unit 131 outputs the extracted BSSID, the floor ID of the identified floor, and the actual measurement value of radio wave strength to the estimation unit 132. When the determination unit 131 cannot extract a BSSID with the actual measurement value of radio wave strength, which is greater than the threshold value that is lowered twice, the determination unit 131 performs error processing. The determination unit 131 outputs the actual measurement value of radio wave strength to the calculation unit 133.

About Estimation Unit 132

The estimation unit 132 is inputted with the floor ID of the identified floor, the BSSID, and the actual measurement value of radio wave strength from the determination unit 131 or the discrimination unit 136 or inputted with the floor ID of the possible floor, the BSSID, and the actual measurement value of radio wave strength from the discrimination unit 136. When the estimation unit 132 is inputted with the floor ID of the possible floor, for example, the estimation unit 132 selects one floor ID in ascending order of floor ID. The estimation unit 132 determines whether or not a BSSID with the actual measurement value of radio wave strength, which is greater than the threshold value, has already been extracted on the floor of the inputted floor ID. When a BSSID with the actual measurement value of radio wave strength, which is greater than the threshold value, has not been extracted, that is, when the floor ID of the possible floor is inputted to the estimation unit 132, the estimation unit 132 extracts a BSSID with the actual measurement value of radio wave strength, which is greater than a predetermined threshold value. When a BSSID with the actual measurement value of radio wave strength, which is greater than the threshold value, has already been extracted, and when the estimation unit 132 can extract a BSSID with the actual measurement value of radio wave strength, which is greater than the predetermined threshold value, the estimation unit 132 reads GMM parameters of the extracted BSSID on the floor from the GMM storage unit 123 and sets the GMM parameters in the particle filter.

When the estimation unit 132 cannot extract a BSSID with the actual measurement value of radio wave strength, which is greater than the predetermined threshold value, or when the estimation unit 132 cannot set the GMM parameters in the particle filter, for example, the estimation unit 132 lowers the predetermined threshold value by 10 dBm and extracts a BSSID again. In the same manner as the determination unit 131, the estimation unit 132 tries to extract a BSSID by lowering the threshold value twice. When the estimation unit 132 cannot extract a BSSID by lowering the threshold value twice, the estimation unit 132 performs error processing. When the estimation unit 132 can set the GMM parameters in the particle filter, the estimation unit 132 estimates the position of the terminal device 10 by using the particle filter. When the estimation unit 132 is inputted with the floor ID of the possible floor from the discrimination unit 136, the estimation unit 132 outputs the estimated position of the terminal device 10 and the floor ID used for the estimation to the calculation unit 133. When the estimation unit 132 is inputted with the floor ID of the identified floor from the determination unit 131 or the discrimination unit 136, the estimation unit 132 transmits the estimated position of the terminal device 10, the floor ID of the identified floor, and information such as a drawing of the identified floor, which is read from the floor storage unit 122, to the terminal device 10 through the communication unit 110 as position information.

Figure 11:
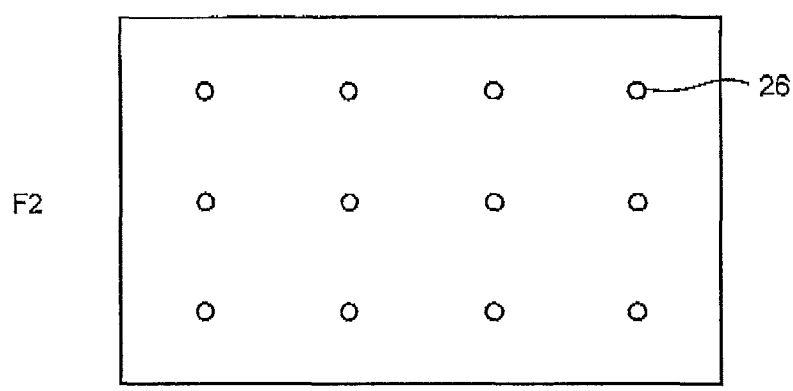
FIG. 11 is an illustration illustrating an example of an initial arrangement of particles of a position estimation process according to the embodiment.
Figure 12:
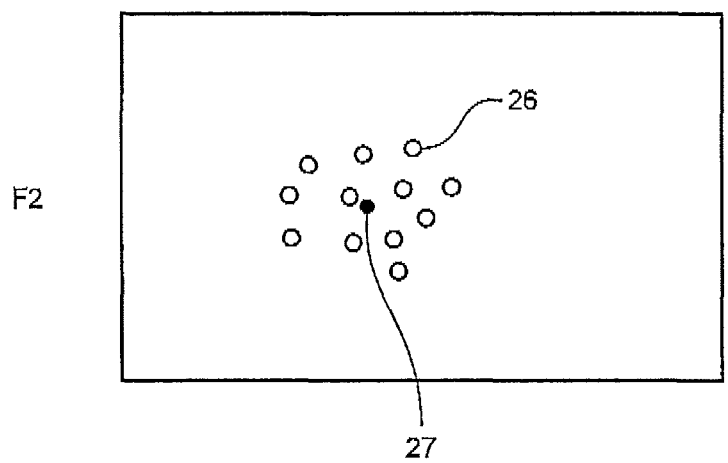
FIG. 12 is an illustration illustrating an example after rearrangement of the particles of the position estimation process according to the embodiment.

Here, the estimation of the position by the particle filter will be described. FIG. 11 is an illustration illustrating an example of an initial arrangement of particles of a position estimation process according to the embodiment. In the example of FIG. 11, particles 26 are evenly arranged on the floor F2. Each particle 26 moves according to the existence probability in the GMM of the base station 15. Specifically, each particle 26 is weighted according to the existence probability, added with random walk, and sampled. When the weight of each particle 26 is used as a probability that other particles 26 next move to the position of the particle 26, many of other particles 26 are rearranged around a particle 26 with a large weight. FIG. 12 is an illustration illustrating an example after rearrangement of the particles of the position estimation process according to the embodiment. The example of FIG. 12 illustrates a state in which, for example, other particles 26 gather around a particle 26 with a large weight. In other words, it can be estimated that an estimated position 27 of the terminal device 10 is close to the particle 26 with a large weight.

About Calculation Unit 133

The calculation unit 133 is inputted with the estimated position of the terminal device 10 and the floor ID from the estimation unit 132. Further, the calculation unit 133 is inputted with the actual measurement value of radio wave strength from the determination unit 131. The calculation unit 133 refers to the base station storage unit 121 based on the floor ID and extracts a BSSID (base station 15) that can be received on the floor indicated by the floor ID. The calculation unit 133 reads the GMM of the extracted BSSID from the GMM storage unit 123, calculates the radio wave strength of the BSSID at the estimated position of the terminal device 10, and determines the calculated radio wave strength as the estimated value of the radio wave strength.

Figure 13:
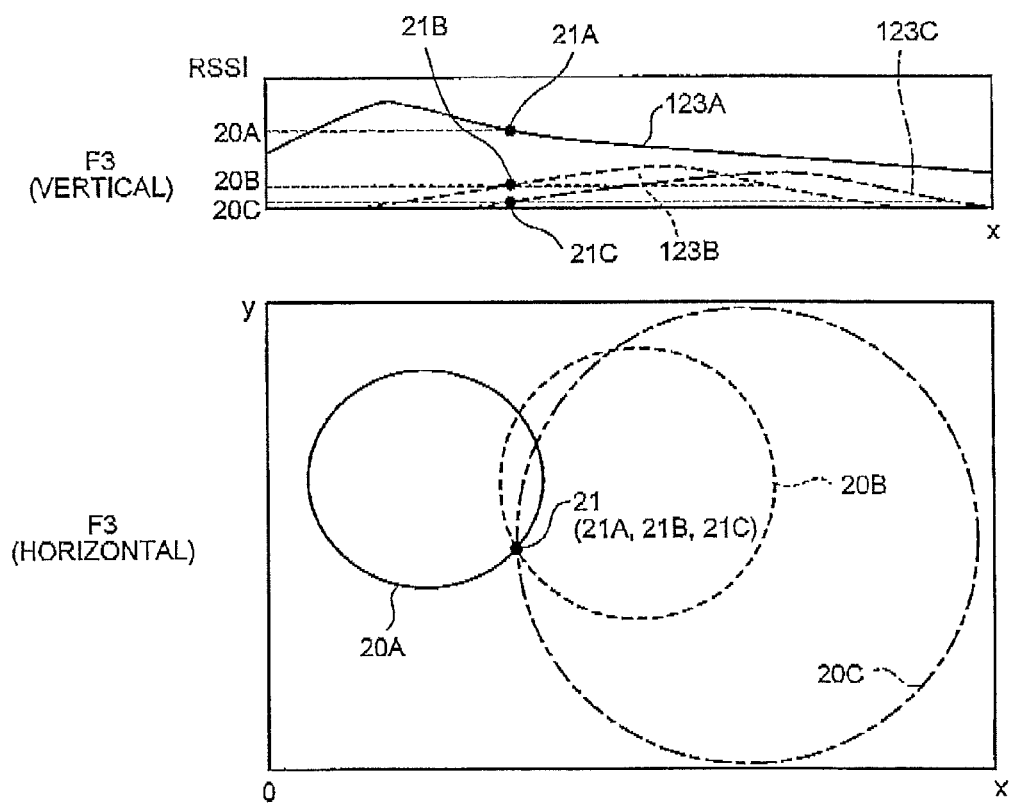
FIG. 13 is an illustration illustrating an example of an estimated value calculation process according to the embodiment.

Here, the calculation of the estimated value of the radio wave strength of the BSSID at the estimated position of the terminal device 10 will be described. FIG. 13 is an illustration illustrating an example of an estimated value calculation process according to the embodiment. For example, it is assumed that the estimated position of the terminal device 10 is the estimated position 21, the floor ID is F3, the base stations 15 that can be received on the floor F3 are the base stations 15A to 15C, and the GMMs corresponding to the base stations 15A to 15C are GMMs 123A to 1230. At this time, the calculation unit 133 calculates an estimated value 21A of radio wave strength from the GMM 123A at the estimated position 21. In the same manner, the calculation unit 133 calculates an estimated value 21B of radio wave strength from the GMM 123B at the estimated position 21 and calculates an estimated value 21C of radio wave strength from the GMM 123C at the estimated position 21.

The calculation unit 133 calculates a probability that the terminal device 10 is located on the floor on the basis of a normal distribution from the received actual measurement values of radio wave strength and the estimated values of radio wave strength for each BSSID at the estimated position 21. The probability that the terminal device 10 is located on the floor can be calculated according to, for example, a difference between the estimated value and the actual measurement value of radio wave strength. Here, in the example of FIG. 13, the actual measurement values of radio wave strength are actual measurement values 20A to 20C. At this time, it is assumed that, on the GMM, the actual measurement values 20A to 20C correspond to circular ring portions as illustrated on the horizontal surface in FIG. 13. Here, there are overlapping portions between the estimated values 21A to 210 of radio wave strength and the actual measurement values 20A to 20C of radio wave strength. In other words, it can be said that there is hardly any difference between the estimated values 21A to 21C of radio wave strength and the actual measurement values 20A to 20C of radio wave strength. Here, the probability can be represented by a one-dimensional normal distribution indicated by Formula (3) for each BSSID and, for example, in the case of a floor A where three BSSIDs can be extracted, the probability that the terminal device 10 is located on the floor can be an average value of the probabilities of the BSSIDs as indicated by Formula (4). Further, for example, in the case of a floor B where two BSSIDs can be extracted, in the same manner, the probability can be an average value of the probabilities of the BSSIDs as indicated by Formula (5).

$$f(RSSI, E) = \frac{1}{\sqrt{2\pi}} e^{-\frac{(RSSI-E)^2}{2}} \quad (3)$$

$$P_A = \frac{f(RSSI_{A1}, E_{A1}) + f(RSSI_{A2}, E_{A2}) + f(RSSI_{A3}, E_{A3})}{3} \quad (4)$$

$$P_B = \frac{f(RSSI_{B1}, E_{B1}) + f(RSSI_{B2}, E_{B2})}{2} \quad (5)$$

Figure 14:
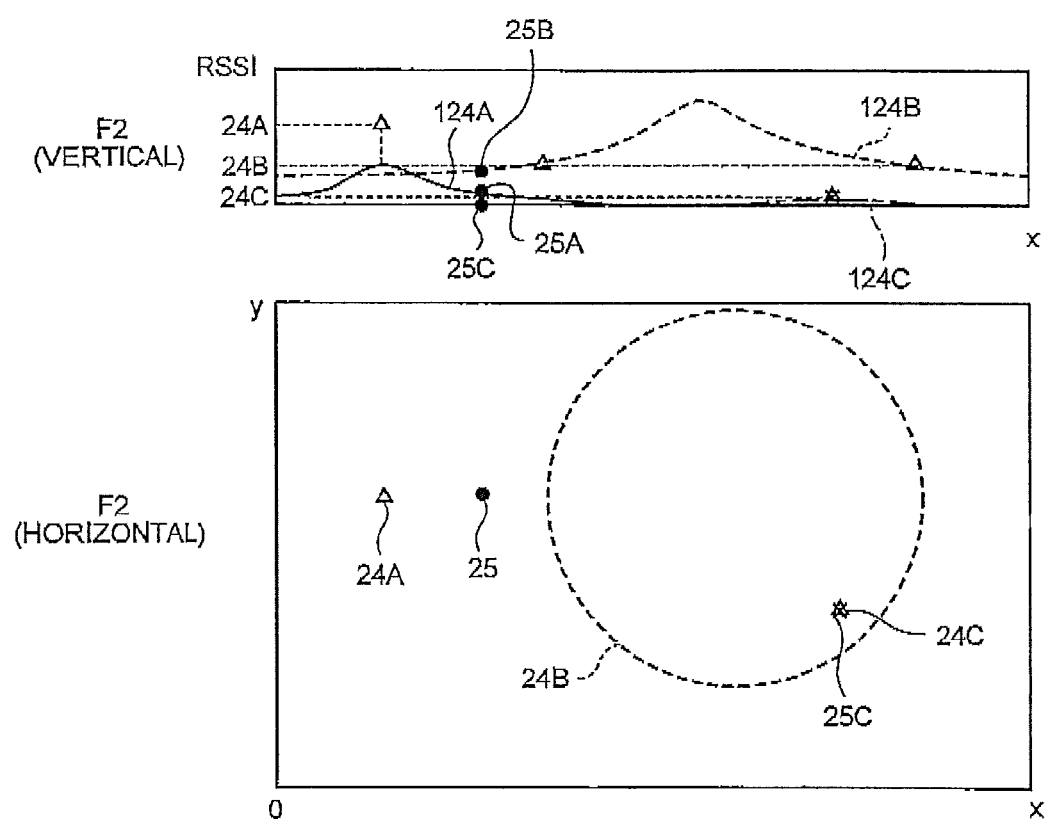
FIG. 14 is an illustration illustrating an example of the estimated value calculation process according to the embodiment.

Here, FIG. 14 illustrates the floor F2 as another example. FIG. 14 is an illustration illustrating an example of the estimated value calculation process according to the embodiment. In the example of FIG. 14, the estimated position of the terminal device 10 is the estimated position 25 and the actual measurement values of radio wave strength are the actual measurement values 24A to 24C, which are indicated by triangle marks. Further, the GMMs corresponding to the base stations 15A to 15C are the GMMs 124A to 1240. At this time, there is no value corresponding to the actual measurement value 24A on the GMM 124A, so that the value corresponding to the actual measurement value 24A is the value of the top of the mountain of the GMM 124A, which is closest to the actual measurement value 24A as illustrated on the horizontal surface in FIG. 14. The position corresponding to the actual measurement value 24B has a circular ring shape on the GMM as illustrated on the horizontal surface in FIG. 14. Further, the value corresponding to the actual measurement value 24C on the GMM 124C is just the top of the mountain of the GMM 124C.

The calculation unit 133 calculates an estimated value 25A of radio wave strength from the GMM 124A at the estimated position 25. In the same manner, the calculation unit 133 calculates an estimated value 25B of radio wave strength from the GMM 124B at the estimated position 25 and calculates an estimated value 25C of radio wave strength from the GMM 1240 at the estimated position 25. However, at the estimated position 25, the radio wave strength of the GMM 124C is smaller than or equal to a measuring limit, so that the calculation unit 133 determines, for example, −120 dBm as the estimated value 25C.

Here, in the example of FIG. 14, regarding the differences between the estimated values 25A to 25C of radio wave strength and the actual measurement values 24A to 24C of radio wave strength, when comparing the estimated value 25A and the actual measurement value 24A, the actual measurement value 24A is greater than the estimated value 25A. Although the estimated value 25B and the actual measurement value 24B are close to each other, the actual measurement value 24B is greater than the estimated value 25B. When comparing the estimated value 25C and the actual measurement value 24C, the actual measurement value 24C is greater than the estimated value 25C. As a result, when calculating the probability that the terminal device 10 is located on the floor from the estimated values 25A to 25C of radio wave strength and the actual measurement values 24A to 24C of radio wave strength by using Formulas (3) to (5), the probability is lower than that of the example in FIG. 13.

The calculation unit 133 determines whether or not the position of the terminal device 10 has been estimated for all the floor IDs of the possible floors. If there are one or more possible floors remaining, the calculation unit 133 instructs the estimation unit 132 to perform the position estimation process and the calculation process for the next floor ID. When the calculation unit 133 has estimated the position of the terminal device 10 for all the possible floors, the calculation unit 133 associates the floor ID of each floor with the calculated estimated position and existence probability of the terminal device 10 on each floor and outputs the floor IDs, the estimated positions, and the existence probabilities to the identification unit 134.

About Identification Unit 134

When the estimated position and the existence probability of the terminal device 10 on each floor are inputted to the identification unit 134 from the calculation unit 133, the identification unit 134 compares the existence probabilities of the terminal device 10 on the floors. The identification unit 134 identifies that a floor where the existence probability of the terminal device 10 is the highest among the compared floors is the floor where the terminal device 10 is located. The identification unit 134 transmits the estimated position of the terminal device 10, the floor ID of the identified floor, and information such as a drawing of the identified floor, which is read from the floor storage unit 122, to the terminal device 10 through the communication unit 110 as position information.

About Preparation Unit 135

The preparation unit 135 calculates coefficients of parameters of the discriminant function used in the discrimination unit 136 on the basis of the radio wave strength measured in advance. The preparation unit 135 acquires the radio wave strength measured in advance at a plurality of points on the entire floor for each floor by using, for example, the terminal device 10. As a pre-measurement, the preparation unit 135 receives the radio wave strength measured at each point on each floor by using, for example, the terminal device 10 through the base station 15, the network N, and the communication unit 110, and stores the radio wave strength in the pre-measurement storage unit 124 as pre-measurement data.

The preparation unit 135 determines the maximum value of radio wave strength (RSSI_max) for each BSSID for each floor, that is, for each floor ID, of the pre-measurement data stored in the pre-measurement storage unit 124. Specifically, in the example of FIG. 6, for example, for the BSSID "BSSID1" of the floor ID "F1", the preparation unit 135 determines the maximum value −50 dBm of a plurality of radio wave strengths (RSSI; 1: −75 dBm, 2: −50 dBm, and 3: −60 dBm) as the RSSI_max of "BSSID1" and stores the maximum value −50 dBm in the item "RSSI_max" in the pre-measurement storage unit 124. The preparation unit 135 performs the same operation for the other floor IDs and BSSIDs to determine the RSSI_max and store the RSSI_max in the item "RSSI_max" in the pre-measurement storage unit 124. When generalizing these maximum values, the maximum radio wave strength of BSSIDj on a floor i can be represented as Rmax(i, j). Here, i is an index identifying the floor and j is an index identifying the BSSID.

The preparation unit 135 acquires radio wave strength measured for verification at a plurality of points on a floor by using, for example, the terminal device 10 in a state in which the floor is known. As a measurement for verification, the preparation unit 135 receives the radio wave strength measured at each position on each floor by using, for example, the terminal device 10 through the base station 15, the network N, and the communication unit 110, and stores the radio wave strength in the verification data storage unit 125 as verification data.

The preparation unit 135 refers to the pre-measurement storage unit 124 and the verification data storage unit 125 and determines a floor, where the at least a part of BSSIDs measured for verification corresponds with the BSSIDs of the pre-measurement, as a candidate floor. In the examples of FIGS. 6 and 7, the verification data illustrated in FIG. 7 includes "BSSID1" to "BSSID5". When searching the pre-measurement storage unit 124 illustrated in FIG. 6 for the BSSIDs illustrated in FIG. 7, the floor ID "F1" includes "BSSID1" to "BSSID5", the floor ID "F2" includes "BSSID1", "BSSID2", and "BSSID4", and the floor ID "F3" includes "BSSID1", "BSSID2", and "BSSID3". The preparation unit 135 determines these search results as the candidate floors. In other words, the preparation unit 135 excludes floors of floor IDs that include no BSSID included in the verification data from the candidate floors.

When the preparation unit 135 determines the candidate floors, the preparation unit 135 calculates the parameters x1 to x5 of the discriminant function indicated by Formula (6) for each candidate floor. The solution f of the discriminant function indicated by Formula (6) is 1 when the discriminant function is true, and the solution f is 0 when the discriminant function is false.

$$f(xi)=k0+k1*x1+k2*x2+k3*x3+k4*x4+k5*x5 \quad (6)$$

Here, the calculation of the parameters x1 to x5 of the discriminant function will be described with reference to FIG. 15. FIG. 15 is an illustration illustrating an example of the parameter calculation of the discriminant function. First, the preparation unit 135 acquires the maximum value of radio wave strength (RSSI_max) from the pre-measurement storage unit 124 for each BSSID of each candidate floor. Further, the preparation unit 135 acquires the radio wave strength (RSSI) of each BSSID for each verification data ID from the verification data storage unit 125. The preparation unit 135 calculates a difference (diff) between the RSSI of each BSSID of the verification data ID and the RSSI_max of each BSSID of each candidate floor.

In the examples of FIGS. 6, 7, and 15, regarding the floor ID "F1", the RSSI of "BSSID1" of the verification data ID "0" is −60 dBm, and the RSSI_max of the floor ID "F1" and "BSSID1" of the pre-measurement data is −50 dBm. The difference (diff) is −60−(−50)=−10 dBm. The preparation unit 135 also calculates the difference (diff) for each BSSID of each candidate floor. The reason why the preparation unit 135 calculates the parameters even for a false floor as a candidate floor is to obtain a pattern of a false floor and use the pattern in a regression analysis for calculating coefficients of the parameters.

When the difference (diff) is calculated for each BSSID of each candidate floor, the preparation unit 135 calculates the parameters x1 to x5. The preparation unit 135 calculates the maximum value of differences between the RSSIs and the RSSI_maxes as the parameter x1. The maximum value of differences is a parameter that means the greater the exceedance, the higher the probability of another floor. The preparation unit 135 calculates the number of positive differences between the RSSIs and the RSSI_maxes as the parameter x2. The positive difference indicates another floor, so that the number of positive differences is a parameter that means the greater the number of positive differences, the higher the probability of another floor.

The preparation unit 135 calculates an average value of the differences between the RSSIs and the RSSI_maxes as the parameter x3. The average value of the differences is a parameter that means when a value exceeding the RSSI_max is high as a whole, the probability of another floor is high even when considering denial by non-exceedance (minus) of the difference, that is, denial by a value indicating a high probability that the current floor is the floor where the terminal device 10 is located. The preparation unit 135 calculates an average value of positive differences between the RSSIs and the RSSI_maxes as the parameter x4. The average value of positive differences excludes differences of non-exceedance and is a parameter that means the greater the average of exceedance widths, the higher the probability of another floor. The preparation unit 135 calculates the number of BSSIDs of each candidate floor which correspond with BSSIDs included in the verification data as the parameter x5. The number of BSSIDs that correspond with each other is a parameter that means the greater the number of BSSIDs that are the base of the determination, that is, the greater the number of base stations 15, the higher the reliability.

In the example of FIG. 15, the parameters x1 to x5 are calculated as "2", "1", "−2.8", "2", and "5" respectively. The preparation unit 135 also calculates the parameters x1 to x5 for other candidate floors. In the example of FIG. 15, on the candidate floors "F2" and "F3"; the number of BSSIDs on each candidate floor that correspond with BSSIDs included in the verification data is three for each floor, so that the parameters x1 to x5 of the candidate floors "F2" and "F3" are calculated based on the three BSSIDs. The preparation unit 135 associates the calculated parameters with the verification data ID, the actual measurement floor ID that is the floor ID where the verification data is measured, and the candidate floor ID, and stores the parameters and the IDs in the candidate floor storage unit 126.

In the preparation unit 135, the solution f of the discriminant function is set for each candidate floor of each verification data ID. The floor of the verification data is known, so that for each candidate floor of each verification data ID, if the candidate floor is correct, "1" is set to the solution f of the discriminant function by an administrator of the position identification server 100, and if the candidate floor is not correct, "0" is set to the solution f by the administrator. In the example of FIG. 8, there are three candidate floor IDs "F1", "F2", and "F3" for the verification data ID "0". At this time, the floor ID of the floor, where the verification data is measured and which is indicated by the actual measurement floor ID, is "F1", so that "1" is set to the solution f of the discriminant function of the candidate floor ID "F1" and "0" is set to the solution f of the discriminant function of the candidate floor IDs "F2" and "F3". The solution f of the discriminant function is set for many other verification IDs in the same manner. The preparation unit 135 stores the set solutions f of the discriminant function in the candidate floor storage unit 126.

The preparation unit 135 calculates the coefficients k1 to k5 corresponding to the parameters x1 to x5 of the discriminant function and the coefficient k0 that is a constant term by a regression analysis on the basis of the parameters x1, to x5 of the candidate floor and the solution f of the discriminant function which are stored in the candidate floor storage unit 126. Here, the coefficient k0 is a constant determined as a result of the regression analysis when all the parameters x1 to x5 are 0. However, another predetermined constant may be used as the coefficient k0. The preparation unit 135 performs the regression analysis for all the verification data IDs and calculates the coefficients k0 to k5 for all the actual measurement floor IDs. In other words, the preparation unit 135 calculates the coefficients k0 to k5 of the parameters x1 to x5 of the discriminant function for each floor ID. The preparation unit 135 associates the calculated coefficients k0 to k5 with the floor ID and stores the coefficients k0 to k5 and the floor ID in the coefficient storage unit 127.

The preparation unit 135 can determine the coefficients k0 to k5 globally not for each floor (that is, commonly for all the floors) or can determine the coefficients k0 to k5 for each area including a plurality of floors. The preparation unit 135 calculates the coefficients k0 to k5 by, for example, performing regression analysis for all the floors or for each area. The preparation unit 135 may calculate one set of coefficients k0 to k5 by calculating the coefficients k0 to k5 for each floor and, for example, averaging the calculated coefficients k0 to k5 of the floors. In this way, it is possible to omit change of coefficients and obtain discriminant coefficients that can be used more universally by calculating one set of coefficients k0 to k5 for a global area, for all the floors, or for any area.

About Discrimination Unit 136

When the floor ID of the extracted floor and the actual measurement value of radio wave strength are inputted to the discrimination unit 136 from the determination unit 131, the discrimination unit 136 determines whether or not the number of the extracted floors is one. When the number of the extracted floors is not one, the discrimination unit 136 calculates the parameters x1 to x5 of the discriminant function for each floor ID of the extracted floors. Here, the calculation of the parameters x1 to x5 is the same process as the calculation of the parameters x1 to x5 in the preparation unit 135 and the calculation is performed by using the actual measurement value of radio wave strength received from the terminal device 10 instead of the verification data, so that the detailed description thereof will be omitted. When generalizing the calculation of each parameter using the actual measurement value of radio wave strength, the actual measurement value of radio wave strength for each BSSIDj can be represented as Rj. Further, a difference dji between the actual measurement value of radio wave strength and the maximum radio wave strength Rmax(i, j) of the BSSIDj on the floor i can be represented as dji=Rj−Rmax(i, j). In summary, the discrimination unit 136 calculates the parameters x1 to x5 for the BSSIDj.

The discrimination unit 136 refers to the coefficient storage unit 127 and sets the coefficients k0 to k5 corresponding to the floor ID of each extracted floor to the discriminant function indicated by Formula (6). The discrimination unit 136 calculates the solution f of the discriminant function by applying the calculated parameters x1 to x5 to the discriminant function to which the coefficients k0 to k5 are set. The discrimination unit 136 calculates the solution f of the discriminant function for all the floor IDs of the extracted floors.

The discrimination unit 136 determines whether or not there are one or more floor IDs for which the solution f of the discriminant function is greater than or equal to a predetermined value. When there are one or more floor IDs for which the solution f of the discriminant function is greater than or equal to the predetermined value, the discrimination unit 136 identifies that the floor of the floor ID for which the solution f of the discriminant function is the greatest is the floor where the terminal device 10 is located. When there is no floor ID for which the solution f of the discriminant function is greater than or equal to the predetermined value, the discrimination unit 136 determines that the floor cannot be identified by the discriminant function. Here, for example, the predetermined value can be 0.5. The solution f of the discriminant function has a value between 1 and 0, and the value may be, for example, 0.8 or 0.6 even for the correct floor because the parameters vary due to the radio wave environment. When the number of the extracted floors is one and when the floor is identified by the discriminant function, the discrimination unit 136 outputs the floor ID of the identified floor, the BSSID, and the actual measurement value of radio wave strength to the estimation unit 132. When the floor cannot be identified by the discriminant function, the discrimination unit 136 outputs the floor ID of a possible floor, the BSSID, and the actual measurement value of radio wave strength to the estimation unit 132.

6. Preparation Process

Figure 16:
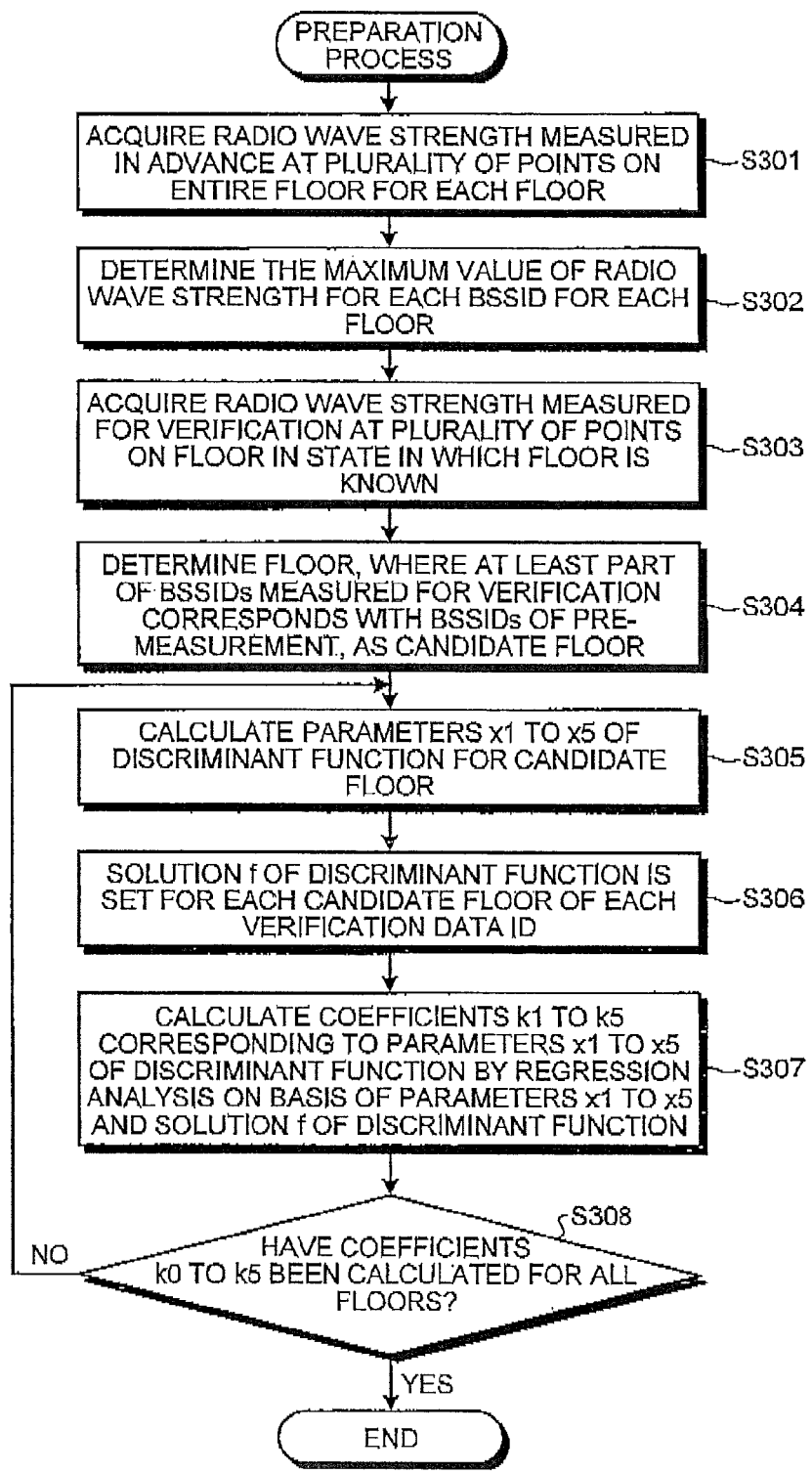
FIG. 16 is a flowchart illustrating an example of a preparation process of a position identification server according to the embodiment.

Next, a preparation process of the position identification system 1 according to the embodiment will be described. FIG. 16 is a flowchart illustrating an example of the preparation process of the position identification server according to the embodiment.

The preparation unit 135 of the position identification server 100 acquires the radio wave strength measured in advance at a plurality of points on the entire floor for each floor by using, for example, the terminal device 10 (step S301). The preparation unit 135 stores the acquired radio wave strength in the pre-measurement storage unit 124 as the pre-measurement data.

The preparation unit 135 determines the maximum value of radio wave strength (RSSI_max) for each BSSID for each floor of the pre-measurement data stored in the pre-measurement storage unit 124 (step S302).

The preparation unit 135 acquires the radio wave strength (RSSI) measured for verification at a plurality of points on a floor by using, for example, the terminal device 10 in a state in which the floor is known (step S303).

The preparation unit 135 refers to the pre-measurement storage unit 124 and the verification data storage unit 125 and determines a floor, where at least a part of BSSIDs measured for verification corresponds with the BSSIDs of the pre-measurement, as a candidate floor (step S304). In other words, the preparation unit 135 determines floors of the pre-measurement data including the BSSID of the base station 15 measured for verification to be candidate floors.

When the preparation unit 135 determines the candidate floors, the preparation unit 135 calculates the parameters x1 to x5 of the discriminant function indicated by Formula (6) for each candidate floor (step S305). When the preparation unit 135 has calculated parameters x1 to x5, the preparation unit 135 associates the calculated parameters with the verification data ID, the actual measurement floor ID, and the candidate floor ID, and stores the parameters and the IDs in the candidate floor storage unit 126.

In the preparation unit 135, the solution f of the discriminant function is set for each candidate floor of each verification data ID by an administrator of the position identification server 100 (step S306). The preparation unit 135 stores the set solutions f of the discriminant function in the candidate floor storage unit 126.

The preparation unit 135 calculates the coefficients k1 to k5 corresponding to the parameters x1 to x5 of the discriminant function and the coefficient k0 by a regression analysis on the basis of the parameters x1 to x5 of the candidate floor and the solution f of the discriminant function which are stored in the candidate floor storage unit 126 (step S307). The preparation unit 135 associates the calculated coefficients k0 to k5 with the floor ID and stores the coefficients k0 to k5 and the floor ID in the coefficient storage unit 127.

The preparation unit 135 determines whether or not the coefficients k0 to k5 have been calculated for all the floors (step S308). When the coefficients k0 to k5 have not been calculated for all the floors (step S308: No), the preparation unit 135 returns to step S305 and calculates the coefficients k0 to k5 for the remaining floors. When the coefficients k0 to k5 have been calculated for all the floors (step S308: Yes), the preparation unit 135 ends the preparation process. When the preparation unit 135 has calculated one set of coefficients k0 to k5 for a global area, for all the floors, or for any area, the preparation unit 135 ends the preparation process without performing the process of step S308. Thereby, it is possible to calculate the coefficients of the discriminant function for each floor, for a global area, for all the floors, or for any area.

7. Position Identification Process

Figure 17:
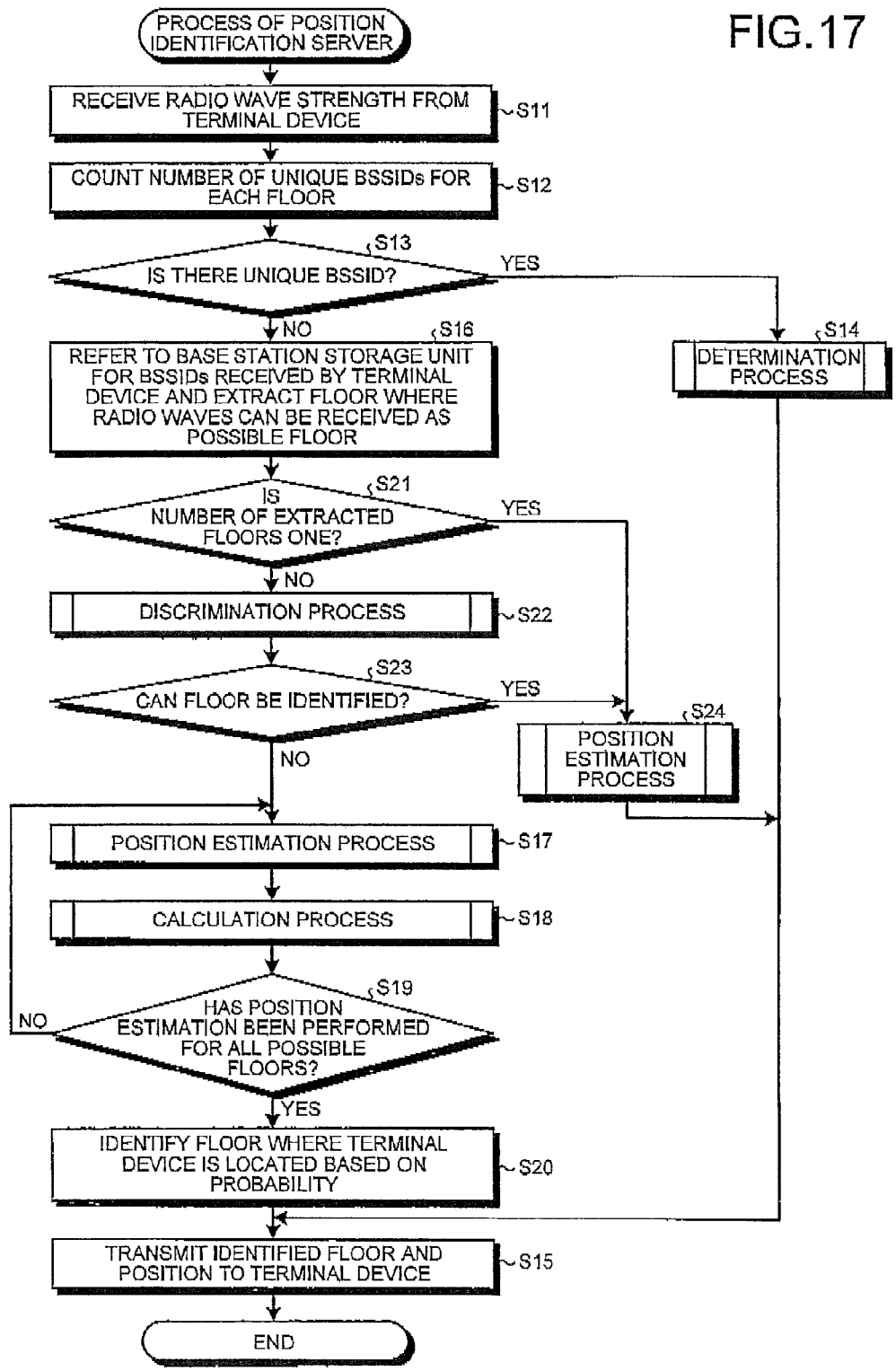
FIG. 17 is a flowchart illustrating an example of a position identification process of the position identification server according to the embodiment.

Next, a position identification process of the position identification system 1 according to the embodiment will be described. FIG. 17 is a flowchart illustrating the position identification process of the position identification server according to the embodiment.

First, the terminal device 10 receives the radio waves of the base stations 15A to 15C in a building 5. The terminal device 10 detects the BSSIDs of the base stations 15A to 15C from the received radio waves and acquires the actual measurement value of radio wave strength of the received radio waves for each BSSID. The terminal device 10 associates the BSSID with the actual measurement value of radio wave strength and transmits the BSSID and the actual measurement value of radio wave strength to the position identification server 100 through the network N.

The determination unit 131 of the position identification server 100 receives the BSSIDs and the actual measurement values of radio wave strength from the terminal device 10 (step S11). The determination unit 131 refers to the base station storage unit 121 and extracts and counts the number of BSSIDs of the base stations 15 that can be received on only a certain floor from among the received BSSIDs (step S12). The determination unit 131 determines whether or not there is a unique BSSID (step S13). When there is no unique BSSID (step S13: no), the determination unit 131 refers to the base station storage unit 121 for the received BSSIDs, extracts a floor where radio waves can be received as a possible floor, and outputs the floor ID of the extracted floor and the actual measurement value of radio wave strength to the discrimination unit 136 (step S16). When there are one or more unique BSSIDs (step S13: Yes), the determination unit 131 performs a determination process (step S14).

Figure 18:
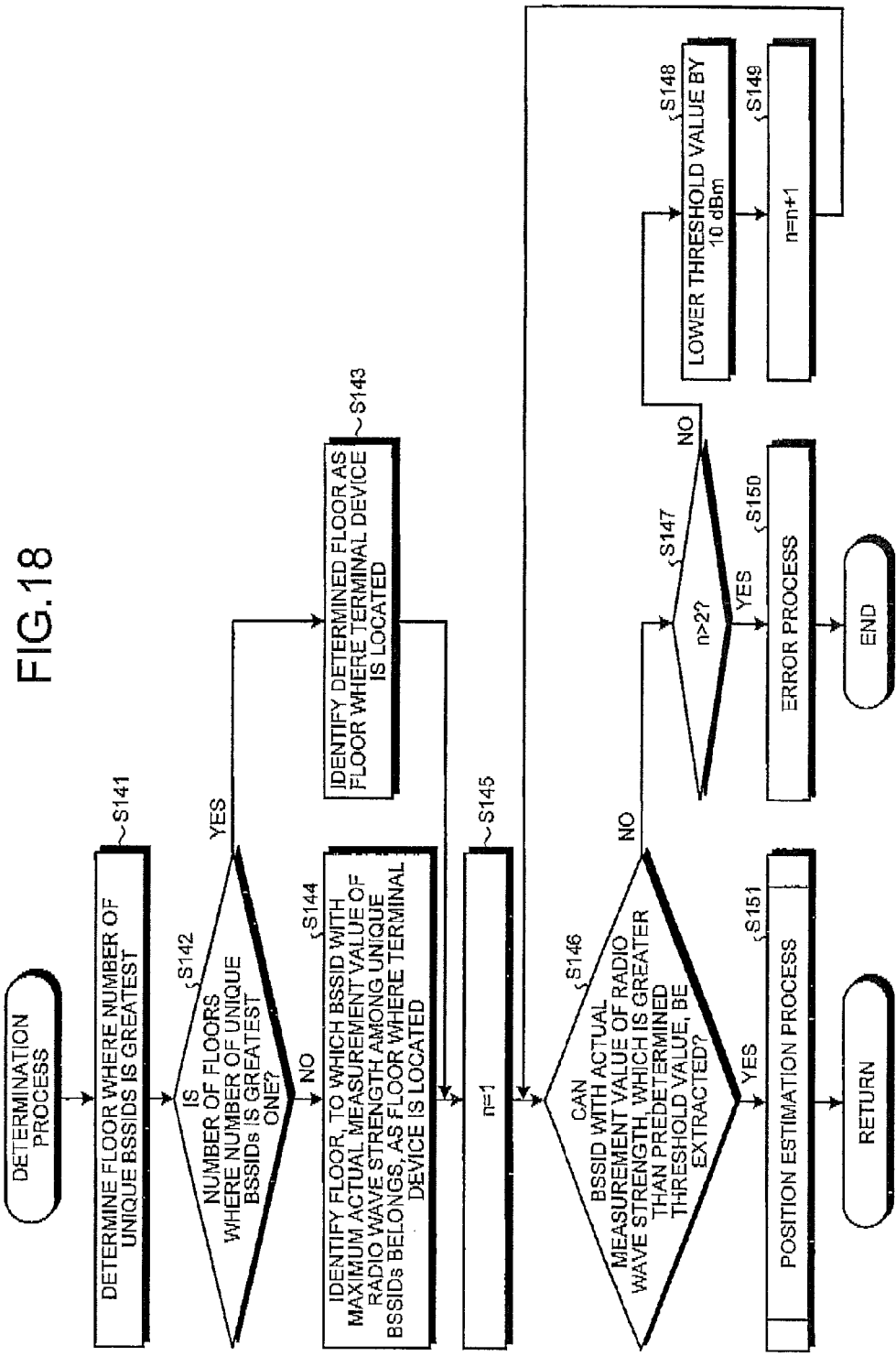
FIG. 18 is a flowchart illustrating an example of a determination process of the position identification server according to the embodiment.

Here, the determination process will be described with reference to FIG. 18. FIG. 18 is a flowchart illustrating the determination process of the position identification server according to the embodiment. The determination unit 131 determines a floor where the number of unique BSSIDs is the greatest (step S141). The determination unit 131 determines whether or not the number of floors where the number of unique BSSIDs is the greatest is one (step S142). When the number of the floors where the number of unique BSSIDs is the greatest is one (step S142: Yes), the determination unit 131 identifies that the determined floor is the floor where the terminal device 10 is located (step S143). When the number of the floors where the number of unique BSSIDs is the greatest is two or more (step S142: No), the determination unit 131 identifies that a floor, to which a BSSID with the maximum actual measurement value of radio wave strength among the unique BSSIDs belongs, is the floor where the terminal device 10 is located (step S144).

The determination unit 131 sets an initial value of the number of times n to try to extract a BSSID with the radio wave strength greater than a threshold value to 1 (step S145). The determination unit 131 extracts a BSSID with the actual measurement value of radio wave strength, which is greater than a predetermined threshold value. The determination unit 131 determines whether or not a BSSID with the actual measurement value of radio wave strength, which is greater than the predetermined threshold value, can be extracted (step S146). When the determination unit 131 can extract a BSSID with the actual measurement value of radio wave strength, which is greater than the predetermined threshold value (step S146: Yes), the determination unit 131 outputs the extracted BSSID to the estimation unit 132 and performs the position estimation process (step S151).

When the determination unit 131 cannot extract a BSSID with the actual measurement value of radio wave strength, which is greater than the predetermined threshold value (step S146: No), the determination unit 131 determines whether or not the number of times n is greater than 2 (step S147). When the number of times n is smaller than or equal to 2 (step S147: No), the determination unit 131 lowers the predetermined threshold value by 10 dBm (step S148), adds 1 to the number of times n (step S149), returns to step S146, and extracts a BSSID again. When the number of times n is greater than 2 (step S147: Yes), the determination unit 131 performs an error process and ends the process (step S150).

The determination unit 131 repeats the process of steps S146 to S149 and tries to extract a BSSID by lowering the predetermined threshold value twice. At this time, if the determination unit 131 can extract a BSSID with the actual measurement value of radio wave strength, which is greater than the lowered threshold value (step S146: Yes), the determination unit 131 outputs the extracted BSSID to the estimation unit 132 and performs the position estimation process (step S151).

Figure 19:
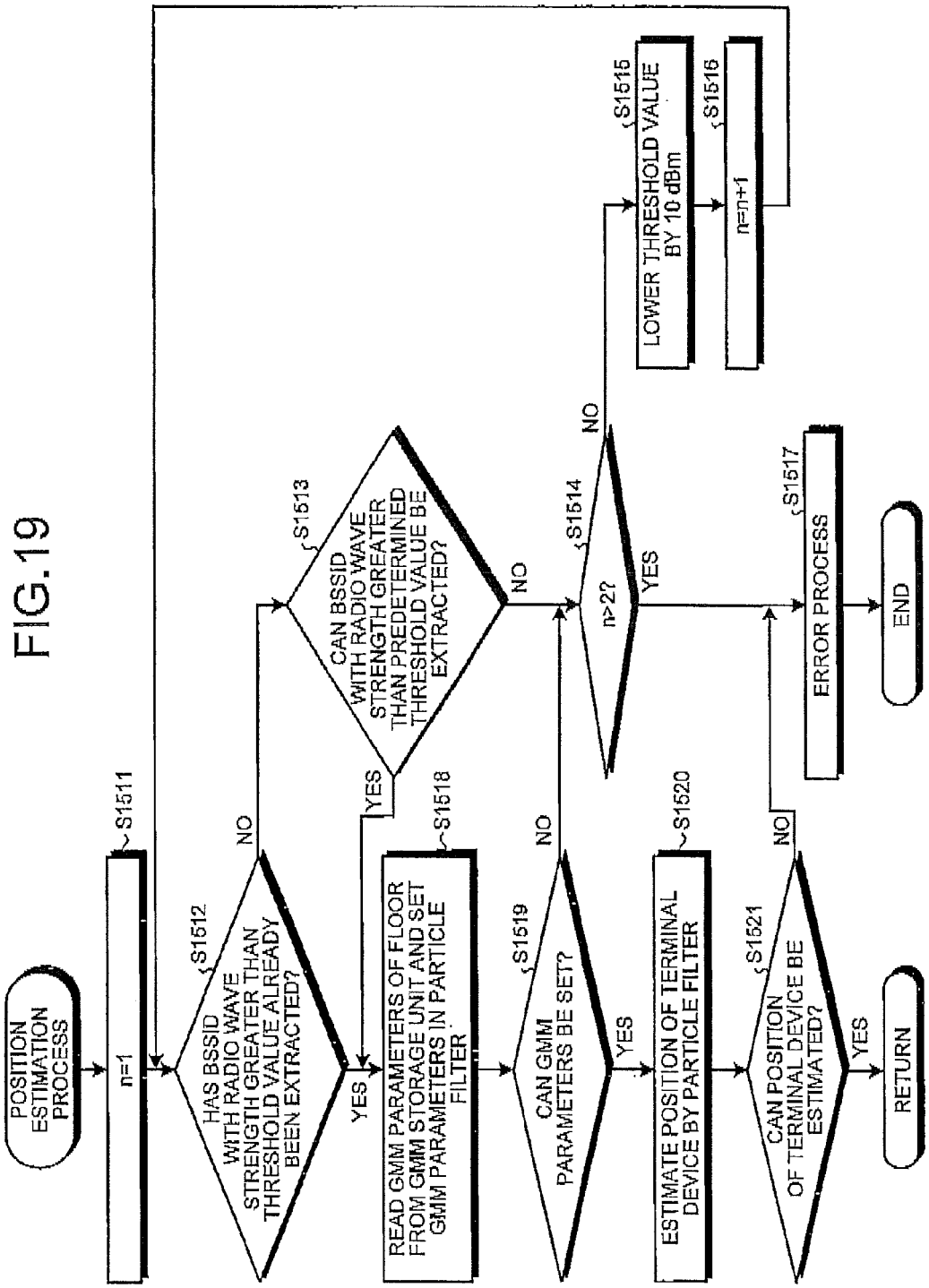
FIG. 19 is a flowchart illustrating an example of a position estimation process of the position identification server according to the embodiment.

Here, the position estimation process will be described with reference to FIG. 19. FIG. 19 is a flowchart illustrating the position estimation process of the position identification server according to the embodiment. When the floor ID of the possible floor is inputted to the estimation unit 132 from the discrimination unit 136, that is, when a BSSID with the actual measurement value of radio wave strength, which is greater than the threshold value, has not been extracted, the estimation unit 132 performs the same process as the determination process. Therefore, the estimation unit 132 sets the initial value of the number of times n to try to extract a BSSID with the radio wave strength greater than a threshold value to 1 (step S1511). When the estimation unit 132 is inputted with the floor ID of the possible floor, for example, the estimation unit 132 selects one floor ID in ascending order of floor ID. When the estimation unit 132 is inputted with the floor ID of the identified floor, the estimation unit 132 selects the floor ID. The estimation unit 132 determines whether or not a BSSID with the actual measurement value of radio wave strength, which is greater than the threshold value, has already been extracted on the floor of the selected floor ID.

When a BSSID with the actual measurement value of radio wave strength, which is greater than the threshold value, has not been extracted (step S1512: No), the estimation unit 132 extracts a BSSID with the actual measurement value of radio wave strength, which is greater than a predetermined threshold value. The estimation unit 132 determines whether or not a BSSID with the actual measurement value of radio wave strength, which is greater than the predetermined threshold value, can be extracted (step S1513). When the estimation unit 132 can extract a BSSID with the actual measurement value of radio wave strength, which is greater than the predetermined threshold value (step S1513: Yes), the estimation unit 132 reads GMM parameters of the extracted BSSID on the floor from the GMM storage unit 123 and sets the GMM parameters in the particle filter (step S1518).

When the estimation unit 132 cannot extract a BSSID with the actual measurement value of radio wave strength, which is greater than the predetermined threshold value (step S1513: No), the estimation unit 132 determines whether or not the number of times n is greater than 2 (step S1514). When the number of times n is smaller than or equal to 2 (step S1514: No), the estimation unit 132 lowers the predetermined threshold value by 10 dBm (step S1515), adds 1 to the number of times n (step S1516), returns to step S1512 and step S1513, and extracts a BSSID again. When the number of times n is greater than 2 (step S1514: Yes), the estimation unit 132 performs an error process and ends the process (step S1517).

When a BSSID with the actual measurement value of radio wave strength, which is greater than the threshold value, has not been extracted, the estimation unit 132 repeats the process of steps S1512 to S1516 and tries to extract a BSSID by lowering the predetermined threshold value twice. When the estimation unit 132 can extract a BSSID with the actual measurement value of radio wave strength, which is greater than the lowered threshold value (step S1512: Yes), the estimation unit 132 reads the GMM parameters of the extracted BSSID on the floor from the GMM storage unit 123 and sets the GMM parameters in the particle filter (step S1518).

The estimation unit 132 determines whether or not the GMM parameters can be set in the particle filter (step S1519). When the GMM parameters can be set in the particle filter (step S1519: Yes), the estimation unit 132 estimates the position of the terminal device 10 by using the particle filter (step S1520). When the GMM parameters cannot be set in the particle filter (step S1519: No), the estimation unit 132 proceeds to step S1514, lowers again the threshold value to extract a BSSID, and tries to extract a BSSID with the actual measurement value of radio wave strength, which is greater than the threshold value.

The estimation unit 132 determines whether or not the position of the terminal device 10 can be estimated by the particle filter (step S1521). When the position of the terminal device 10 can be estimated by the particle filter (step S1521: Yes), the estimation unit 132 ends the position estimation process and returns to the original process. When the position of the terminal device 10 cannot be estimated by the particle filter (step S1521: No), the estimation unit 132 performs the error process and ends the process (step S1517).

After the process of step S151 in FIG. 18 is completed, let us return to the description of FIG. 17. The estimation unit 132 transmits the estimated position of the terminal device 10, the floor ID of the identified floor, and information such as a drawing of the identified floor, which is read from the floor storage unit 122, to the terminal device 10 through the communication unit 110 as position information (step S15). The control unit 12 of the terminal device 10 maps the position information received from the position identification server 100 onto, for example, a map to display the position information on the display unit 13.

Next, processes after the floor ID of the floor where radio waves can be received and the actual measurement value of radio wave strength are outputted to the discrimination unit 136 in step S16 when there is no unique BSSID in step S13 will be described.

When the floor ID of the extracted floor and the actual measurement value of radio wave strength are inputted to the discrimination unit 136 from the determination unit 131, the discrimination unit 136 determines whether or not the number of the extracted floors is one (step S21). When the number of the extracted floors is one (step S21: Yes), the discrimination unit 136 outputs the floor ID of the extracted floor, the BSSID, and the actual measurement value of radio wave strength to the estimation unit 132. The estimation unit 132 performs the position estimation process for the extracted floor (step S24) and proceeds to step S15. The position estimation process in step S24 is the same as the position estimation process in step S151, so that the description thereof will be omitted.

Figure 20:
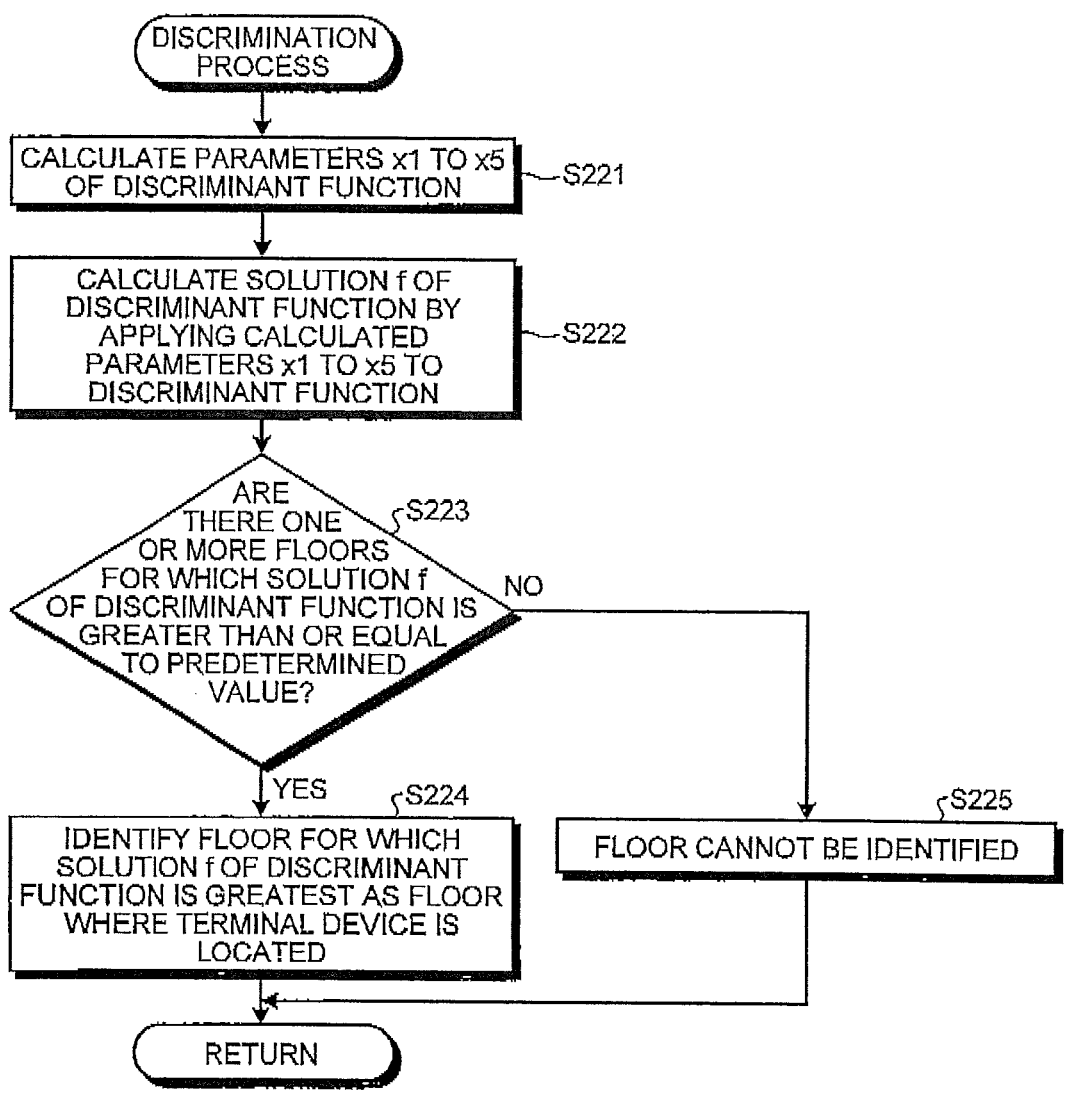
FIG. 20 is a flowchart illustrating an example of a discrimination process of the position identification server according to the embodiment.

When the number of the extracted floors is not one (step S21: No), the discrimination unit 136 performs a discrimination process (step S22). Here, the discrimination process will be described with reference to FIG. 20. FIG. 20 is a flowchart illustrating an example of the discrimination process of the position identification server according to the embodiment. The discrimination unit 136 calculates the parameters x1 to x5 of the discriminant function for each floor ID of the extracted floors (step S221). The discrimination unit 136 refers to the coefficient storage unit 127 and sets the coefficients k0 to k5 corresponding to the floor ID of each extracted floor to the discriminant function indicated by Formula (6). The discrimination unit 136 calculates the solution f of the discriminant function by applying the calculated parameters x1 to x5 to the discriminant function to which the coefficients k0 to k5 are set (step S222). Here, the discrimination unit 136 calculates the solution f of the discriminant function for all the floor IDs of the extracted floors.

When the discrimination unit 136 calculates the solution f of the discriminant function for all the floor IDs of the extracted floors, the discrimination unit 136 determines whether or not there are one or more floor IDs for which the solution f of the discriminant function is greater than or equal to a predetermined value (step S223). When there are one or more floor IDs for which the solution f of the discriminant function is greater than or equal to the predetermined value (step S223: Yes), the discrimination unit 136 identifies that the floor of the floor ID for which the solution f of the discriminant function is the greatest is the floor where the terminal device 10 is located (step S224) and returns to the original process. When there is no floor ID for which the solution f of the discriminant function is greater than or equal to the predetermined value (step S223: No), the discrimination unit 136 determines that the floor cannot be identified by the discriminant function (step S225) and returns to the original process.

Let us return to the description of FIG. 17. The discrimination unit 136 determines whether or not the floor can be identified by the discrimination process (step S23). When the floor can be identified by the discrimination process (step S23: Yes), the discrimination unit 136 outputs the floor ID of the identified floor, the BSSID, and the actual measurement value of radio wave strength to the estimation unit 132. The estimation unit 132 performs the position estimation process for the extracted floor (step S24) and proceeds to step S15.

When the floor cannot be identified by the discrimination process (step S23: No), the discrimination unit 136 outputs the floor ID of the possible floor, the BSSID, and the actual measurement value of radio wave strength to the estimation unit 132.

When the estimation unit 132 is inputted with the floor ID of the possible floor, for example, the estimation unit 132 selects one floor ID in ascending order of floor ID. The estimation unit 132 performs the position estimation process for the floor of the selected floor ID (step S17). The position estimation process in step S17 is the same as the position estimation process in step S151, so that the description thereof will be omitted.

When the position estimation process is completed for one of the floor IDs of the possible floors, the estimation unit 132 outputs the estimated position of the terminal device 10 and the floor ID used for the estimation to the calculation unit 133.

Figure 21:
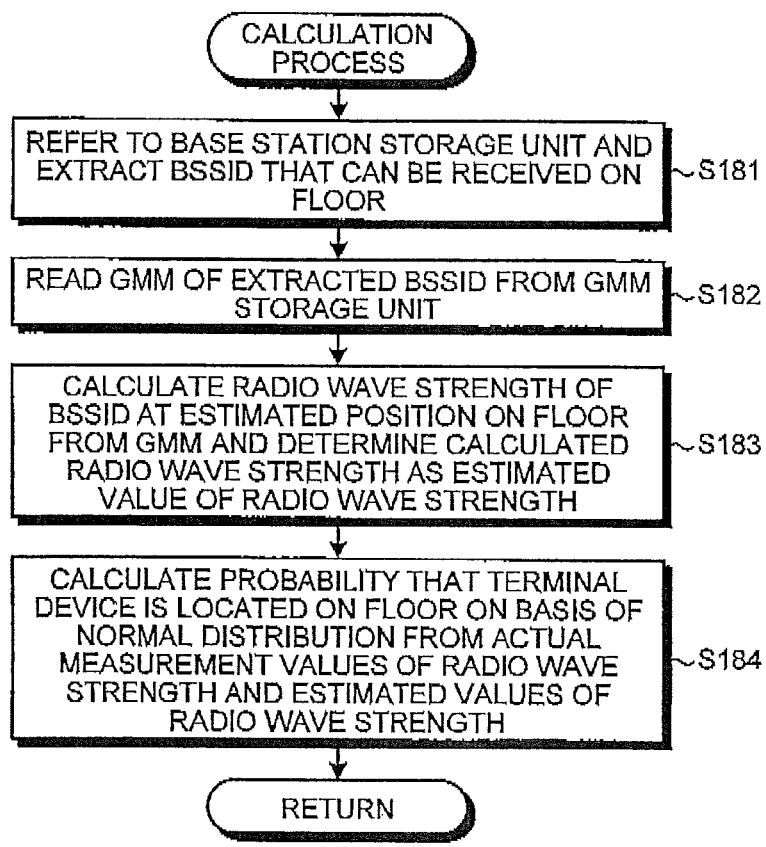
FIG. 21 is a flowchart illustrating an example of a calculation process of the position identification server according to the embodiment.

When the estimated position of the terminal device 10 and the floor ID are inputted to the calculation unit 133 from the estimation unit 132, the calculation unit 133 performs a calculation process (step S18). Here, the calculation process will be described with reference to FIG. 21. FIG. 21 is a flowchart illustrating the calculation process of the position identification server according to the embodiment.

The calculation unit 133 refers to the base station storage unit 121 based on the floor ID and extracts a BSSID (base station 15) that can be received on the floor indicated by the floor ID (step S181). The calculation unit 133 reads the GMM of the extracted BSSID from the GMM storage unit 123 (step S182), calculates the radio wave strength of the BSSID at the estimated position of the terminal device 10; and determines the calculated radio wave strength as the estimated value of the radio wave strength (step S183).

The calculation unit 133 calculates a probability that the terminal device 10 is located on the floor on the basis of a normal distribution from the actual measurement values of radio wave strength inputted from the determination unit 131 and the estimated values of radio wave strength for each BSSID at the estimated position of the terminal device 10 (step S184).

Let us return to the description of FIG. 17. The calculation unit 133 determines whether or not the position of the terminal device 10 has been estimated for all the floor IDs of the possible floors (step S19). When the position of the terminal device 10 has not been estimated for all the floor IDs of the possible floors (step S19: No), the calculation unit 133 returns to step S17 and performs the process of step S17 and step S18 for the next floor ID. When the position of the terminal device 10 has been estimated for all the floor IDs of the possible floors (step S19: Yes), the calculation unit 133 associates the floor ID of each floor with the calculated estimated position and existence probability of the terminal device 10 on each floor and outputs the floor IDs, the estimated positions, and the existence probabilities to the identification unit 134.

When the estimated position and the existence probability of the terminal device 10 on each floor are inputted to the identification unit 134 from the calculation unit 133, the identification unit 134 compares the existence probabilities of the terminal device 10 on the floors. The identification unit 134 identifies that a floor where the existence probability of the terminal device 10 is the highest among the compared floors is the floor where the terminal device 10 is located (step S20). The identification unit 134 transmits the estimated position of the terminal device 10, the floor ID of the identified floor, and information such as a drawing of the identified floor, which is read from the floor storage unit 122, to the terminal device 10 through the communication unit 110 as position information (step S15). The control unit 12 of the terminal device 10 maps the position information received from the position identification server 100 onto, for example, a map to display the position information on the display unit 13.

8. Effects

In this way, the position identification server 100 stores the coefficients of the parameters in the discriminant function that indicates whether or not the terminal device 10 is located on each floor and the maximum value of radio wave strength of each base station 15 on each floor, which is measured in advance, in the storage unit, and receives the actual measurement value of radio wave strength of the radio waves received by the terminal device 10 from the base station 15. Further, the position identification server 100 calculates the parameters of the discriminant function for each floor based on the received actual measurement value of radio wave strength and the maximum value of radio wave strength stored in the storage unit, calculates the solution of the discriminant function for each floor based on the calculated parameters and the coefficients of the parameters stored in the storage unit, and discriminates that the floor where the solution of the discriminant function is the greatest is the floor where the terminal device 10 is located when there are floors where the solution of the discriminant function is greater than or equal to a predetermined value. Thereby, the position identification server 100 can accurately identify the floor with a small calculation load. Further, the position identification server 100 can reduce the number of floors for which the GMM is calculated by combining the discriminant function and the positioning using the GMM, so that the position identification server 100 can reduce calculation load by reducing the amount of data. Thus, the position identification server 100 can quickly determine the floor where the terminal device 10 is located.

Further, the position identification server 100 calculates the solution of the discriminant function by using one or more of the following parameters: the maximum value of differences between the received actual measurement values of radio wave strength and the maximum value of radio wave strength stored in the storage unit, the number the differences that are positive, the average value of the differences, and the average value of the differences that are positive, and discriminates the floor where the terminal device 10 is located. Thereby, the position identification server 100 can accurately identify the floor with a small calculation load on the basis of the maximum value of the radio wave strength on the floor.

Further, the position identification server 100 calculates the solution of the discriminant function by using the number of matched base stations 15 between the base stations 15 from which the terminal device 10 receives radio waves for each floor and the base stations 15 on each floor stored in the storage unit as a parameter and discriminates the floor where the terminal device 10 is located. Thereby, the position identification server 100 can accurately identify the floor with a small calculation load on the basis of the number of matched base stations 15 between the base stations 15 from which the terminal device 10 receives radio waves and the base stations 15 from which radio waves can be received on each floor.

Further, the position identification server 100 calculates parameters for each floor based on the maximum value of pre-measured radio wave strength of each base station 15 on each floor and the actual measurement value of radio wave strength of each base station 15 for which the floor is known, provides the solution of the discriminant function for each floor, and calculates coefficients corresponding to the parameters as the coefficients of the parameters of the discriminant function. Thereby, the position identification server 100 can identify the floor where the terminal device 10 is located by only substituting the parameters calculated for each floor in the discriminant function.

9. Others

While the embodiment of the present application has been described in detail with reference to the drawings, the embodiment is an example and it is possible to implement the present invention not only in the forms described in the section of the disclosure of the invention, but also in other forms variously modified and improved based on the knowledge of the person skilled in the art.

Although in the embodiment described above, as the probability that the terminal device 10 is located on each floor, the average of probabilities for each base station 15 is used in the calculation unit 133, it is not limited to this. For example, instead of the average of probabilities for each base station 15, the calculation unit 133 can use a value obtained by dividing a sum of probabilities for each base station 15 by the number of base stations on a floor where the number of the base stations 15 for which a difference of radio wave strength is calculated is the greatest among the floors as the probability that the terminal device 10 is located on each floor. Specifically, the position identification server 100 calculates a difference between a calculated estimated value of radio wave strength and a measured actual measurement value of radio wave strength for each base station 15, calculates a value obtained by dividing a sum of probabilities for each base station 15 for which a difference of radio wave strength is calculated on each floor by the number of base stations 15 on a floor where the number of the base stations 15 for which a difference of radio wave strength is calculated is the greatest among the floors according to the calculated differences of radio wave strength as the probability that the terminal device 10 is located on each floor, and identifies the floor where the terminal device 10 is located based on the calculated probability that the terminal device 10 is located. Thereby, the position identification server 100 can accurately identify the floor by weighting a floor where the number of the base stations 15 for which a difference of radio wave strength is calculated is the greatest.

Although in the embodiment described above, the determination unit 131 identifies a floor to which a BSSID with the maximum actual measurement value of radio wave strength among unique BSSIDs belongs as the floor where the terminal device 10 is located, it is not limited to this. For example, when the received maximum radio wave strength of a BSSID (base station 15) unique to a floor is greater than the corresponding maximum radio wave strength of the BSSID unique to the floor stored in the base station storage unit 121, the determination unit 131 can exclude the floor to which the BSSID unique to the floor belongs from the candidates to be identified. Specifically, the position identification server 100 further stores floor-unique base station information in which a floor-unique base station received on one floor, the floor, and the maximum radio wave strength for each floor-unique base station are associated with each other in the storage unit in advance. Further, when the received maximum radio wave strength of the floor-unique base station is greater than the corresponding maximum radio wave strength of the floor-unique base station stored in the storage unit, the determination unit 131 excludes the floor to which the floor-unique base station belongs from the candidates to be identified and determines a floor where the number of received floor-unique base stations is the greatest as the floor where the terminal device 10 is located. Further, when the determination unit 131 cannot identify the floor where the terminal device 10 is located, the position identification server 100 identifies the floor where the terminal device 10 is located. Thereby, the position identification server 100 can exclude the floor to which the base station 15 having the radio wave strength greater than the radio wave strength measured in advance belongs, so that the position identification server 100 can accurately identify the floor with a small processing load.

Although in the embodiment described above, the pre-measurement data is stored in the pre-measurement storage unit 124 and the verification data is stored in the verification data storage unit 125, it is not limited to this. For example, if the position identification server 100 acquires the position where the radio wave strength is measured and acquires the pre-measurement data to which a verification data ID is given when measuring the pre-measurement data, the position identification server 100 can calculate the coefficients of the parameters of the discriminant function by using the data acquired by one-time measurement.

Although in the embodiment described above, the parameters x1 to x5 are used as the parameters of the discriminant function, the parameters are not limited to these. For example, the position identification server 100 may arbitrarily combine one or more of the parameters x1 to x5 to form the discriminant function. For example, the position identification server 100 may use the minimum value of differences between the actual measurement values of radio wave strength (RSSI) and the maximum value of radio wave strength (RSSI_max) on the floor as another parameter. Thereby, the position identification server 100 can identify the floor more multilaterally. Further, the position identification server 100 can use the discriminant function using only necessary parameters, so that it is possible to reduce the amount of data and further reduce the calculation load.

Although in the embodiment described above, the parameter related to the differences between the actual measurement values of radio wave strength (RSSI) and the maximum value of radio wave strength (RSSI_max) on the floor and the number of matched BSSIDs between the BSSIDs that are actually measured and the BSSIDs that can be received on the floor are used as the parameters of the discriminant function, the parameters are not limited to these. For example, the position identification server 100 may define and use a radio wave condition and a shape of the building as the parameters of the discriminant function. Thereby, the position identification server 100 can calculate the coefficients of the parameters of the discriminant function which further reflect the condition of the building, so that it is possible to improve the identification accuracy of the floor.

Although in the embodiment described above, the preparation process and the position identification process are performed by the position identification server 100, it is not limited to this. For example, the terminal device 10 is provided with the determination unit 131, the estimation unit 132, the calculation unit 133, the identification unit 134, the preparation unit 135, the discrimination unit 136, the base station storage unit 121, the floor storage unit 122, the GMM storage unit 123, the pre-measurement storage unit 124, the verification data storage unit 125, the candidate floor storage unit 126, and the coefficient storage unit 127, and the preparation process and the position identification process may be performed by the terminal device 10. Further, it is possible to appropriately change the device that performs each process, such as, the preparation process is performed by the position identification server 100 and the position identification process is performed by the terminal device 10.

Although in the embodiment described above, the discrimination process is performed after the presence or absence of a unique BSSID is determined in the position identification process, it is not limited to this. For example, the position identification server 100 may perform the discrimination process and the position estimation process of steps S22 to S24 instead of the process of the unique BSSID of steps S12 to S14. Thereby, it is possible to omit one stage of process.

Although in the embodiment described above, whether or not there is a floor where the solution f of the discriminant function is greater than or equal to a predetermined value is determined in the discrimination process, it is not limited to this. For example, the position identification server 100 may omit the process of steps S223 and S225, and when the solution f of the discriminant function is calculated, the position identification server 100 may identify a floor where the calculated solution f of the discriminant function is the greatest and identify the floor as the floor where the terminal device 10 is located. Thereby, it is possible to omit steps S23 and S17 to S20 which are the process of calculating the radio wave strength by using the GMM for a plurality of floors in the position identification process, so that the calculation load can be reduced.

The position identification server 100 described above may be realized by a plurality of server computers or may be realized by a single server computer. Further, the configuration can be flexibly changed. For example, some functions are realized by calling an external platform or the like by an API (Application Programming Interface) and network computing.

Figure 22:
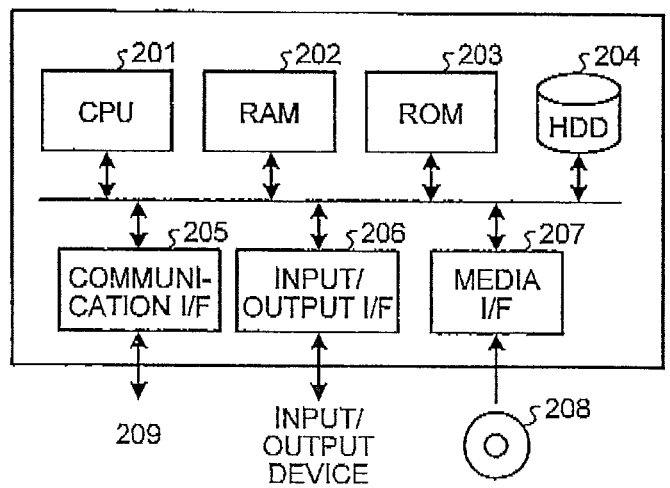
FIG. 22 is a hardware configuration diagram illustrating an example of a computer that realizes a function of the position identification server.

The position identification server 100 according to the embodiment described above is realized by, for example, a computer 200 with a configuration as illustrated in FIG. 22. FIG. 22 is a hardware configuration diagram illustrating an example of a computer that realizes the function of the position identification server. The computer 200 includes a CPU (Central Processing Unit) 201, a RAM (Random Access Memory) 202, a ROM (Read Only Memory) 203, an HDD (Hard Disk Drive) 204, a communication interface (I/F) 205, an input/output interface (I/F) 206, and a media interface (I/F) 207.

The CPU 201 operates based on a program stored in the ROM 203 or the HDD 204 and controls each unit. The ROM 203 stores a boot program executed by the CPU 201 when starting up the computer 200 and a program and the like that depend on the hardware of the computer 200.

The HDD 204 stores a program executed by the CPU 201 and data and the like used by the program. The communication interface 205 receives data from another device through a communication line 209, transmits the data to the CPU 201, and transmits data generated by the CPU 201 to another device through the communication line 209.

The CPU 201 controls output devices such as a display and a printer and input devices such as a keyboard and a mouse through the input/output interface 206. The CPU 201 acquires data from an input device through the input/output interface 206. Further, the CPU 201 outputs the generated data to an output device through the input/output interface 206.

The media interface 207 reads a program or data stored in a recording medium 208 and provides the program or the data to the CPU 201 through the RAM 202. The CPU 201 loads the program onto the RAM 202 from the recording medium 208 through the media interface 207 and executes the loaded program. The recording medium 208 is, for example, an optical recording medium such as a DVD (Digital Versatile Disc) and a PD (Phase change rewritable Disk), a magneto-optical recording medium such as an MO (Magneto-Optical disk), a tape medium, a magnetic recording medium, or a semiconductor memory.

When the computer 200 functions as the position identification server 100 of the embodiment, the CPU 201 of the computer 200 realizes the functions of the determination unit 131, the estimation unit 132, the calculation unit 133, the identification unit 134, the preparation unit 135, and the discrimination unit 136 by executing programs loaded onto the RAM 202. In the HDD 204, data in the base station storage unit 121, the floor storage unit 122, the GMM storage unit 123, the pre-measurement storage unit 124, the verification data storage unit 125, the candidate floor storage unit 126, and the coefficient storage unit 127 is stored.

While the CPU 201 of the computer 200 reads the programs from the recording medium 208 and executes the programs, as another example, the CPU 201 may acquire the programs from another device through the communication line 209.

The flowcharts described in the embodiment are an example, and the order of the steps may be arbitrarily changed as long as inputs and outputs of the processes do not conflict each other. For example, in the preparation process, step S302 and step S303 may be exchanged, so that the maximum radio wave strength measured in advance may be determined after acquiring the radio wave strength measured for verification.

The "means" described in the claims can be replaced with "unit (section, module)", "circuit", or the like. For example, a discrimination means can be replaced with a discrimination unit or a discrimination circuit.

The position identification server according to the present application can accurately identify a floor with a small calculation load.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A position identification server comprising:
   a memory storing: (i) coefficients of parameters of a discriminant function for each of a plurality of floors, and (ii) a maximum value of pre-measured radio wave strength of each base station on each floor, the discriminant function indicating a probability that a terminal device is located on each floor; and
   a processor operatively coupled to the memory, the processor being programmed to:
      receive an actual measurement value of radio wave strength of radio waves received by the terminal device from the base station;
      calculate the parameters of the discriminant function for each floor based on the received actual measurement value of radio wave strength and the maximum value of radio wave strength stored in the memory;
      calculate a solution of the discriminant function for each floor based on the calculated parameters and the coefficients of the stored parameters; and
      when more than one of the calculated solutions of the discriminant function is greater than or equal to a predetermined value, discriminate that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

2. The position identification server according to claim 1, wherein the processor is programmed to:
   calculate a solution of the discriminant function by using, as the parameters, one or more of the following:
      a maximum value of differences between the received actual measurement values of radio wave strength and the maximum value of radio wave strength stored in the memory;
      the number of the differences that are positive;
      an average value of the differences; and
      an average value of the differences that are positive; and
   discriminate a floor where the terminal device is located.

3. The position identification server according to claim 1, wherein the processor is programmed to:
   calculate a solution of the discriminant function by using a number of matched base stations between the base stations from which the terminal device receives radio waves for each floor and the base stations on each floor stored in the memory as parameter; and
   discriminate a floor where the terminal device is located.

4. The position identification server according to claim 1, wherein the processor is programmed to:
   calculate the parameters for each floor based on the maximum value of pre-measured radio wave strength of each base station on each floor and the actual measurement value of radio wave strength of each base station for which the floor is known;
   provide the solution of the discriminant function for each floor; and
   calculate the coefficients corresponding to the parameters as the coefficients of the parameters of the discriminant function.

5. A position identification method causing a computer to execute steps of:
   storing in a memory: (i) coefficients of parameters of a discriminant function for each of a plurality of floors, and (ii) a maximum value of pre-measured radio wave strength of each base station on each floor, the discriminant function indicating a probability that a terminal device is located on each floor;
   receiving an actual measurement value of radio wave strength of radio waves received by the terminal device from the base station;
   calculating the parameters of the discriminant function for each floor based on the received actual measurement value of radio wave strength and the maximum value of radio wave strength stored in the memory;
   calculating a solution of the discriminant function for each floor based on the calculated parameters and the coefficients of the stored parameters; and
   when more than one of the calculated solutions of the discriminant function is greater than or equal to a predetermined value, discriminating that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

6. A non-transitory computer-readable storage medium with an executable position identification program stored on the stored medium, the position identification program causing a computer to execute:
- storing in a memory: (i) coefficients of parameters of a discriminant function for each of a plurality of floors, and (ii) a maximum value of pre-measured radio wave strength of each base station on each floor, the discriminant function indicating a probability that a terminal device is located on each floor;
- receiving an actual measurement value of radio wave strength of radio waves received by the terminal device from the base station;
- calculating the parameters of the discriminant function for each floor based on the received actual measurement value of radio wave strength and the maximum value of radio wave strength stored in the memory;
- calculating a solution of the discriminant function for each floor based on the calculated parameters and the coefficients of the stored parameters; and
- when more than one of the calculated solutions of the discriminant function is greater than or equal to a predetermined value, discriminating that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

7. A terminal device comprising:
- a memory storing: (i) coefficients of parameters of a discriminant function for each of a plurality of floors, and (ii) a maximum value of pre-measured radio wave strength of each base station on each floor, the discriminant function indicating a probability that a terminal device is located on each floor; and
- a processor operatively coupled to the memory, the processor being programmed to:
- measure an actual measurement value of radio wave strength of radio waves received from the base station;
- calculate the parameters of the discriminant function for each floor based on the measured actual measurement value of radio wave strength and the maximum value of radio wave strength stored in the memory;
- calculate a solution of the discriminant function for each floor based on the calculated parameters and the coefficients of the stored parameters; and
- when more than one of the calculated solutions of the discriminant function is greater than or equal to a predetermined value, discriminates that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

8. A position identification method causing a terminal device to execute steps of:
- storing in a memory: (i) coefficients of parameters of a discriminant function for each of a plurality of floors, and (ii) a maximum value of pre-measured radio wave strength of each base station on each floor, the discriminant function indicating a probability that a terminal device is located on each floor;
- measuring an actual measurement value of radio wave strength of radio waves received from the base station;
- calculating the parameters of the discriminant function for each floor based on the measured actual measurement value of radio wave strength and the maximum value of radio wave strength stored in the memory;
- calculating a solution of the discriminant function for each floor based on the calculated parameters and the coefficients of the stored parameters; and
- when more than one of the calculated solutions of the discriminant function is greater than or equal to a predetermined value, discriminating that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

9. A non-transitory computer-readable storage medium with an executable position identification program stored on the stored medium, the position identification program causing a terminal device to execute:
- storing in a memory: (i) coefficients of parameters of a discriminant function for each of a plurality of floors, and (ii) a maximum value of pre-measured radio wave strength of each base station on each floor, the discriminant function indicating a probability that a terminal device is located on each floor;
- measuring an actual measurement value of radio wave strength of radio waves received from the base station;
- calculating the parameters of the discriminant function for each floor based on the measured actual measurement value of radio wave strength and the maximum value of radio wave strength stored in the memory;
- calculating a solution of the discriminant function for each floor based on the calculated parameters and the coefficients of the stored parameters; and
- when more than one of the calculated solutions of the discriminant function is greater than or equal to a predetermined value, discriminating that a floor where the solution of the discriminant function is the greatest is a floor where the terminal device is located, the solution indicating: (i) a lower probability when a maximum value stored in the memory is lower than the actual measurement value, and (ii) a higher probability when the maximum value stored in the memory is higher than the actual measurement value.

10. A position identification server comprising:
- a memory storing: (i) coefficients of parameters of a discriminant function that indicates whether or not a terminal device is located on each floor, (ii) a maximum value of pre-measured radio wave strength of each base station on each floor, and (iii) a base station identifier received on a certain floor among a plurality of floors in association with the floor; and
- a processor operatively coupled to the memory, the processor being programmed to:
- receive an actual measurement value of radio wave strength of radio waves received by the terminal device from the each base station together with a base station identifier of the each base station;
- determine whether the received base station identifier is stored in the memory as the base station identifier that is received on a certain floor;

identify the certain floor as a floor on which the terminal device is located when the received base station identifier is stored in the memory;

when more than one floor is identified as the floor on which the terminal device is located, calculate parameters of the discriminant function for each identified floor based on a difference between: (i) the actual measurement value of radio wave strength, and (ii) the maximum value of radio wave strength stored in the memory;

calculate a solution of the discriminant function for each identified floor based on the calculated parameters and the stored coefficients of the calculated parameters; and when more than one of the calculated solutions of the discriminant function is greater than or equal to a predetermined value, discriminate that a floor where the solution of the discriminant function is the greatest is a floor where the terminal device is located.

* * * * *